(12) United States Patent
Adachi et al.

(10) Patent No.: US 8,577,411 B2
(45) Date of Patent: Nov. 5, 2013

(54) BROADCAST PROGRAM SCENE REPORT SYSTEM AND METHOD, MOBILE TERMINAL DEVICE, AND COMPUTER PROGRAM

(75) Inventors: Yosuke Adachi, Musashino (JP); Kaoru Komatsuda, Saitama (JP); Yohei Inoguchi, Hatogaya (JP)

(73) Assignee: Access Co., Ltd., Tokyo (JP)

( * ) Notice: Subject to any disclaimer, the term of this patent is extended or adjusted under 35 U.S.C. 154(b) by 1447 days.

(21) Appl. No.: 11/922,766

(22) PCT Filed: Jun. 13, 2006

(86) PCT No.: PCT/JP2006/311795
§ 371 (c)(1),
(2), (4) Date: Dec. 20, 2007

(87) PCT Pub. No.: WO2007/004392
PCT Pub. Date: Jan. 11, 2007

(65) Prior Publication Data
US 2009/0042607 A1    Feb. 12, 2009

(30) Foreign Application Priority Data

Jul. 1, 2005   (JP) .................................. 2005-193879
Jul. 1, 2005   (JP) .................................. 2005-193925

(51) Int. Cl.
*H04M 1/00*     (2006.01)
*H04N 5/445*   (2011.01)
*H04N 5/45*     (2011.01)
*H04N 5/765*   (2006.01)

(52) U.S. Cl.
USPC ................... 455/556.1; 455/575.1; 455/403; 725/58; 725/59; 348/565; 386/200

(58) Field of Classification Search
USPC ......... 455/556.1, 575.1; 725/58, 59; 348/565; 386/200
See application file for complete search history.

(56) References Cited

U.S. PATENT DOCUMENTS

2004/0107447 A1* 6/2004 Katagishi et al. ............. 725/135
2004/0154040 A1* 8/2004 Ellis ................................ 725/58
2007/0035664 A1* 2/2007 Kamada et al. ............... 348/565

FOREIGN PATENT DOCUMENTS

JP    08-032886      2/1996
JP    2002-251409 A  9/2002
JP    2003-023617 A  1/2003
(Continued)

OTHER PUBLICATIONS

"Getting Within Range of One-Hour Television Viewing on Mobile Phone," Aug. 18, 2003, Nikkei Electronics, pp. 89-95.

(Continued)

*Primary Examiner* — Ariel Balaoing
(74) *Attorney, Agent, or Firm* — Baker & Hostetler LLP

(57) ABSTRACT

A mobile terminal 20 receives a scene notification message via a communication network 10. The scene notification message at least includes scene identification information for identifying a scene corresponding to a part of a broadcast program, broadcast identification information on the time-difference broadcast of the scene, and URL information for accessing a server in which scene data is stored. Based on the scene notification message, the mobile terminal 20 receives a time-difference broadcast if it is a time at which the scene can be viewed by the time-difference broadcast and, if not, accesses a server 48, in which the data of the scene is stored, to acquire the data of the scene.

15 Claims, 30 Drawing Sheets

(56) References Cited

FOREIGN PATENT DOCUMENTS

| JP | 2004-304306 A | 10/2004 |
| WO | WO-2004/073309 A1 | 8/2004 |
| WO | WO-2005/022913 A1 | 3/2005 |

OTHER PUBLICATIONS

"Special Issue on I-Mode Service Digital Mova with Micro Browser," *NTT DoCoMo Technical Journal* 1(1):28.

International Search Report mailed Oct. 10, 2006, for PCT Application No. PCT/JP2006/311795 filed Jun. 13, 2006, 4 pages.

International Written Opinion mailed Oct. 10, 2006, for PCT Application No. PCT/JP2006/311795 filed Jun. 13, 2006, 10 pages. (English translation attached).

Office Action received for Japanese Patent Application No. 2007-523390, mailed on Sep. 9, 2011, 4 pages (2 pages of English Translation and 2 pages of Office Action).

\* cited by examiner

FIG. 3(a)

USER/SCENE TABLE
441

| USER ID | TELEPHONE NUMBER | MAIL ADDRESS | DESIRED SCENE ID |
|---|---|---|---|
| USER00001 | 090-1234-XXXX | user1@xxx.ne.jp | SCN005,SCN009 |
| USER00002 | 080-3456-XXXX | user2@xxx.ne.jp | SCN001,SCN103 |
| ⋮ | ⋮ | ⋮ | ⋮ |

FIG. 3(b)

REVERSE TABLE
442

| DESIRED SCENE ID | USER ID |
|---|---|
| SCN001 | USER00002,USER00005,USER00011, ⋯ |
| SCN002 | USER00012,USER00108,USER02309, ⋯ |
| ⋮ | ⋮ |

FIG. 7(a)  
PROGRAM A  
(EXAMPLE OF BASEBALL GAME BROADCAST)

SCENE MANAGEMENT TABLE 443a

| SCENE ID | CORRESPONDING DESIRED SCENE ID | TITLE | CH | START TIME | END TIME |
|---|---|---|---|---|---|
| PSCN001 | SCN0001 | BASEBALL GAME BROADCAST /TAKAHASHI | 04 | | |
| ⋮ | ⋮ | ⋮ | ⋮ | ⋮ | ⋮ |
| PSCN059 | SNC0100 | BASEBALL GAME BROADCAST /GIANTSxTIGERS LAST INNING | 04 | | |
| ⋮ | ⋮ | ⋮ | ⋮ | ⋮ | ⋮ |

FIG. 7(b)  
PROGRAM B  
(EXAMPLE OF POPULAR SONG PROGRAM)

SCENE MANAGEMENT TABLE 443b

| SCENE ID | CORRESPONDING DESIRED SCENE ID | TITLE | CH | START TIME | END TIME |
|---|---|---|---|---|---|
| PSCN001 | SCN0101 | POPULAR SONG VARIETY /KITAJIMA JIRO | 01 | 19:15 | 19:20 |
| ⋮ | ⋮ | | ⋮ | ⋮ | ⋮ |
| PSCN012 | SNC0100 | POPULAR SONG VARIETY /ITUMOTO HIROSHI | 01 | 19:35 | 19:40 |
| ⋮ | ⋮ | | ⋮ | ⋮ | ⋮ |

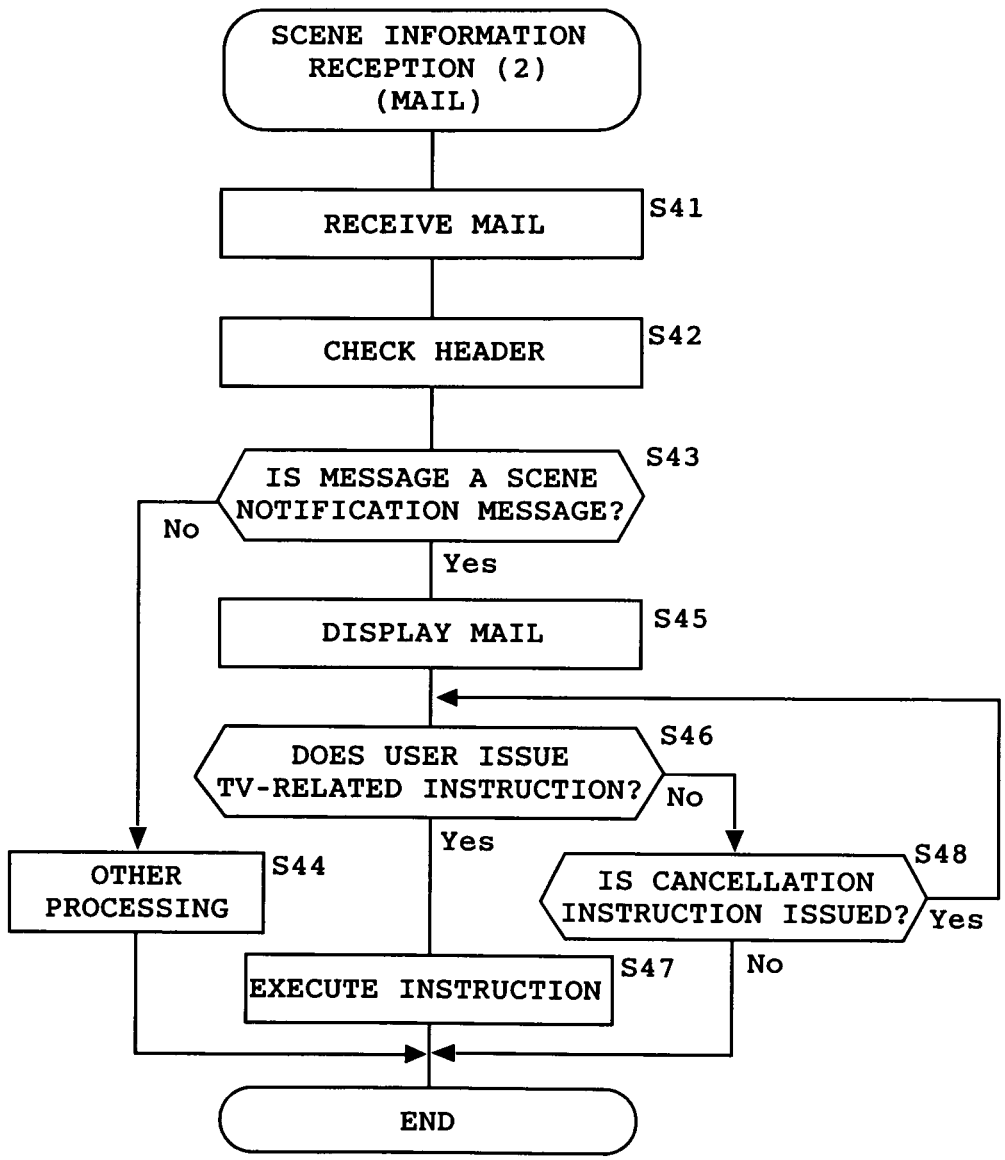

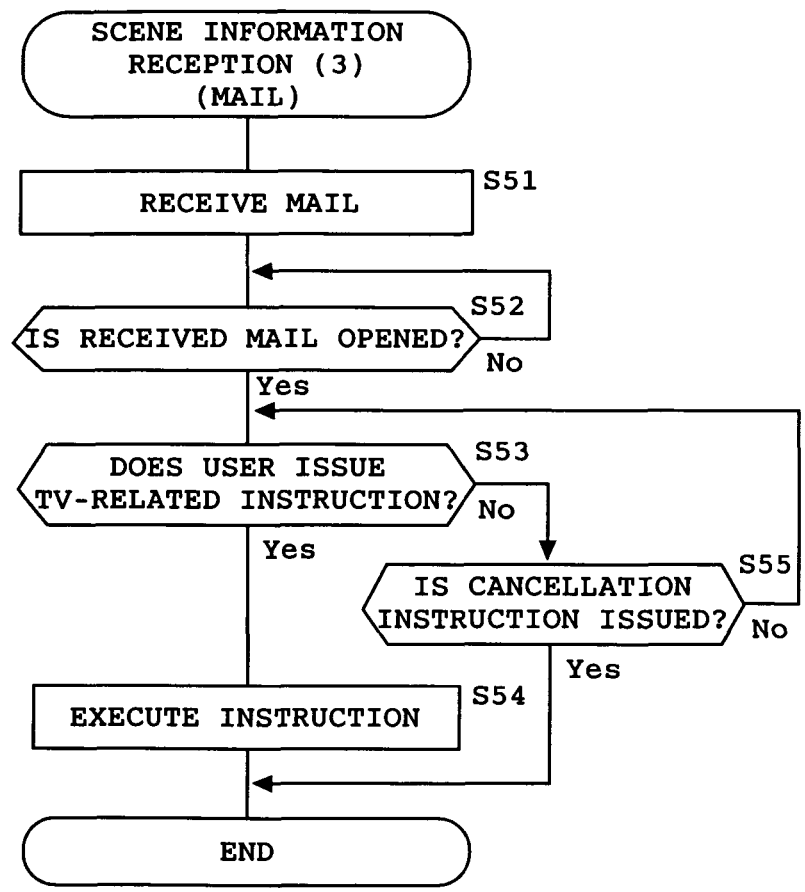

SCENE NOTIFICATION MESSAGE

FIG. 13A

| TAG NAME | MEDIUM INFORMATION | STIME | ETIME | BROADCAST IDENTIFICATION INFORMATION | TIME-DIFFERENCE BROADCAST IDENTIFICATION INFORMATION | TITLE | ACCUMULATION URL |
|---|---|---|---|---|---|---|---|

FIG. 13B

| TAG NAME | MEDIUM INFORMATION | STIME | ETIME | TIME-DIFFERENCE BROADCAST IDENTIFICATION INFORMATION | TITLE | ACCUMULATION URL |
|---|---|---|---|---|---|---|

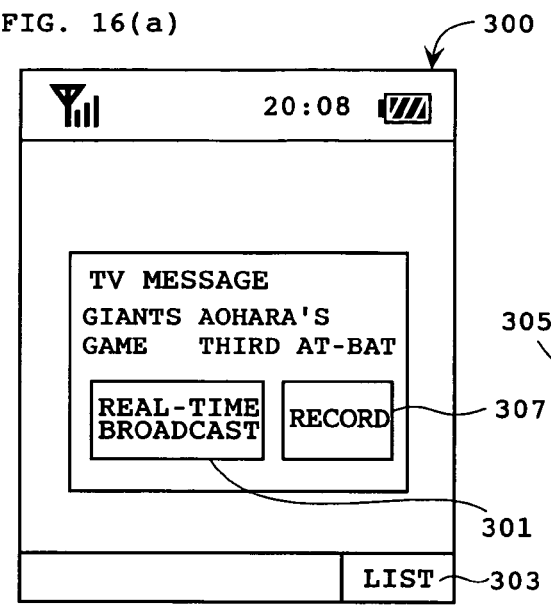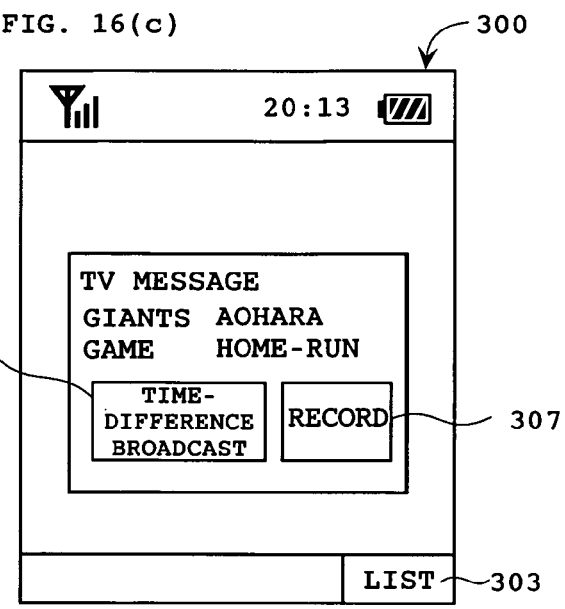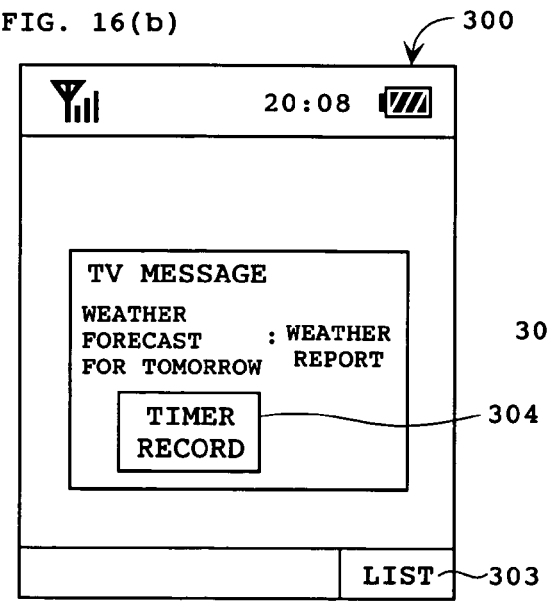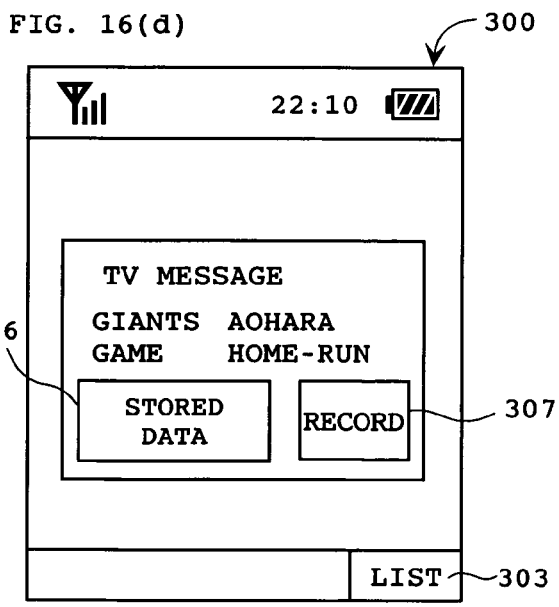

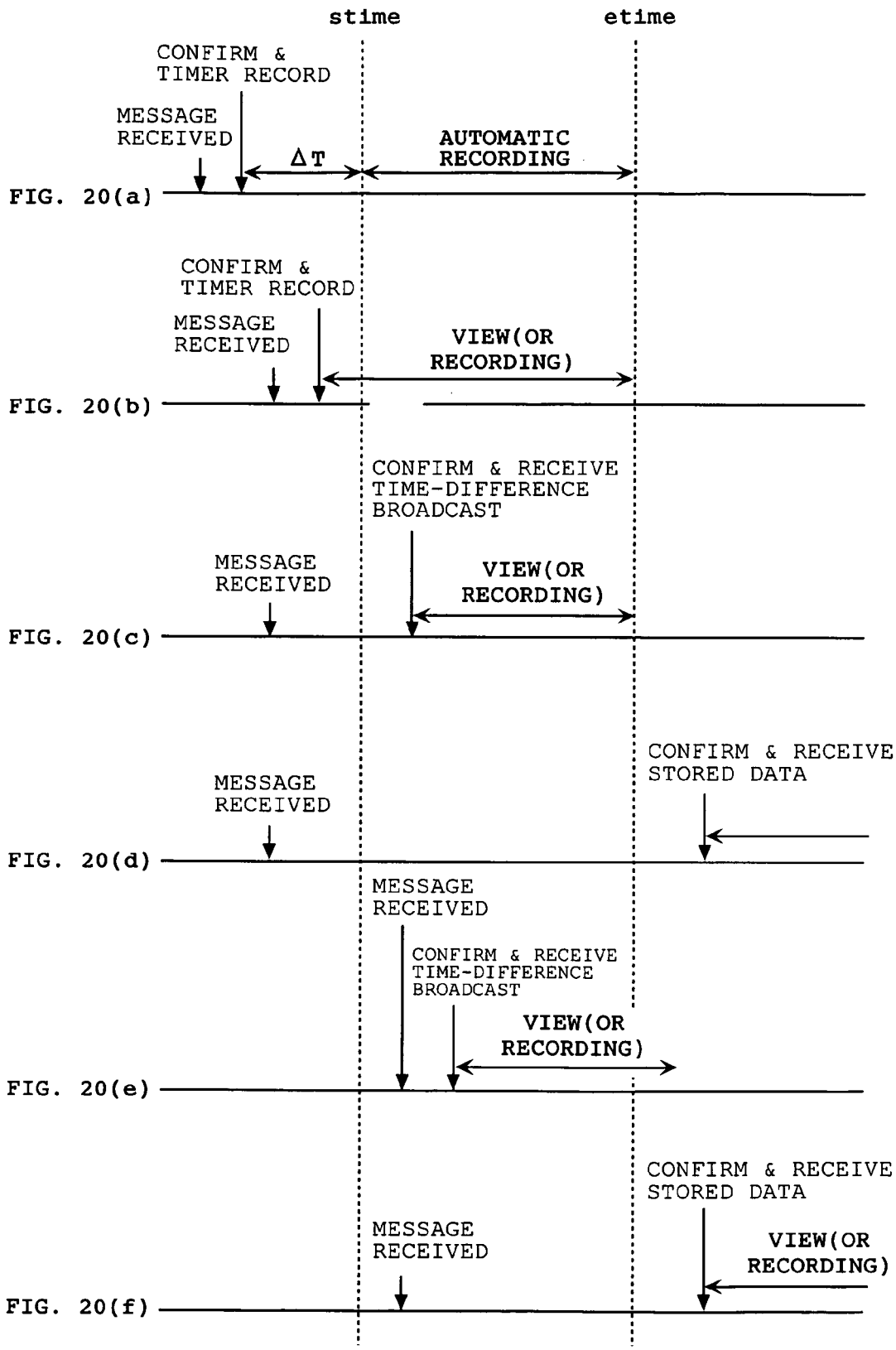

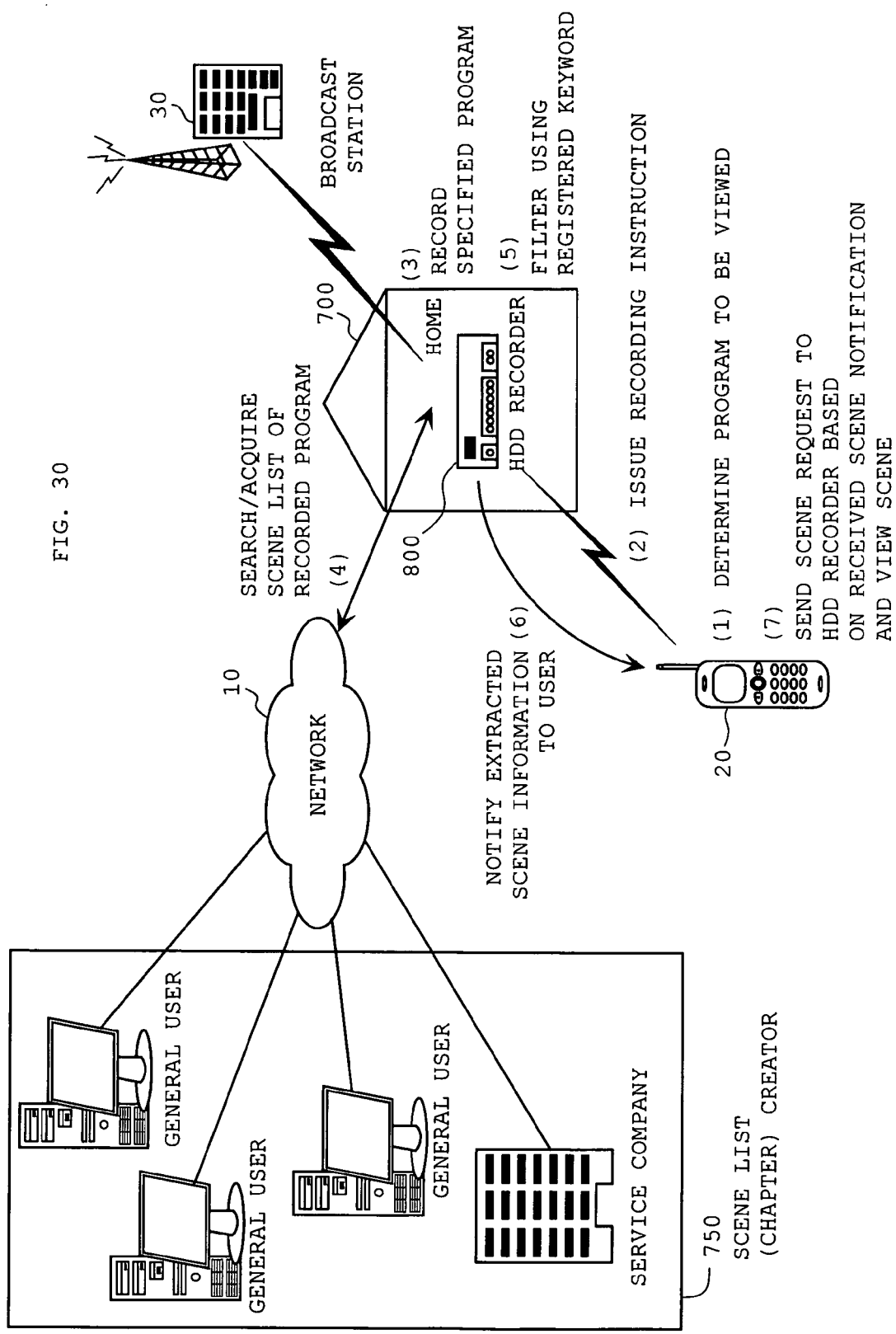

BROADCAST PROGRAM SCENE REPORT SYSTEM AND METHOD, MOBILE TERMINAL DEVICE, AND COMPUTER PROGRAM

TECHNICAL FIELD

The present invention relates to a system that allows a user to reliably view a user-desired broadcast program scene on a terminal device having a broadcast reception/playback capability, especially the television broadcast reception/playback capability.

BACKGROUND ART

Recently, a mobile phone having a capability to receive a terrestrial digital television broadcast is introduced (see Non-Patent Document 1). This capability allows a mobile phone user to view a television broadcast on a mobile phone outside the home at any desired time.

Unlike a fixed television set in the home, a mobile terminal device (hereinafter simply called a mobile terminal), such as a mobile phone, is rarely used to view a television broadcast continuously for a long time because the user is in transit or the reception radio wave status changes or because battery capacity is limited.

Rather, the general mode of viewing a television broadcast on a mobile terminal may be that users view, not a broadcast program in its entirety, but only a part of it, that is, a specific scene of a program which interests the users. For example, a user views a program only for a short time to view scenes such as a scene in which a player of interest goes to the plate during a baseball broadcast, a scene in which a favorite sumo wrestler fights a bout during a grand sumo tournament broadcast, or a scene in which a singer of interest sings a song. However, the fact is that, though the user knows that a program has a scene the user wants to view, the user does not clearly know when the scene will be broadcast in the program. In some cases, the user is not even aware of a program that includes such a scene.

In view of the foregoing, a technology is proposed in which, when an event corresponding to a user-desired keyword registered by the user in advance is generated during a program, a notification message is sent to the user terminal via communication to allow the user on the terminal to view the video immediately when the terminal receives the notification message, or to record the video so that the video is played back for viewing, in response to the notification message (Patent Documents 1, 2, and 3). This technology allows a mobile terminal user, who cannot view a program in its entirety because the user is outside the home or in transit, to view only a desired scene. For an event for which an occurrence time cannot be predicted (for example, a homerun scene during a baseball broadcast), a method is proposed for playing the information recorded in the terminal or for providing a streaming delivery channel.

Patent Document 1: Japanese Patent Laid-Open Publication No. 2002-251409
Patent Document 2: Japanese Patent Laid-Open Publication No. 2003-023617
Patent Document 3: Pamphlet of International publication WO2005/022913
Patent Document 4: Japanese Patent Laid-Open Publication No. Hei 8-032886
Non-Patent Document 1: "Getting within range of one-hour television viewing on mobile phone", Nikkei Electronics, 2003.8.18 issue, pp 89-95
Non-Patent Document 2: "Special Issue on i-mode Service Digital Mova with Micro Browser", NTT DoCoMo Technical Journal Vol. 1, NO. 1, p 28

DISCLOSURE OF THE INVENTION

Problems to be Solved by the Invention

In the meantime, there is a high possibility that a user of a device, such as a mobile terminal, is outside the home or in transit and that, when a notification message is received, the user cannot view the notified channel immediately in response to the notification message.

Therefore, when the user actually confirms the content of each notification message received on the terminal and wants to view the notified scene, the situation depends on the relation between that time and the start time and the end time of the scene. For example, when the user receives a notification of a scene, whose start time is known in advance, at an earlier time before the start time and the user can respond to it immediately, there is still time until the start time of the scene and so, even if the user starts viewing, the user cannot view the scene immediately. In some cases, when the user confirms a notification message, the start time of the scene is already past but the end time is not reached. In this case, the user can immediately start viewing the scene in real time to view it from the middle, but not the scene in its entirety. In addition, in some cases, a notification message is left unnoticed for a longtime and, when the user confirms it, the end time of the scene is already past.

Another problem is that, when there are more users, more channels to be serviced, and more scenes desired by users, generating a notification message for each of the scenes for which users desire a notification and sending the generated notification message to each user will increase the load of the service provider side and cause communication congestion.

In view of the foregoing, it is an object of the present invention to provide a broadcast program scene notification system and method, a mobile terminal device, and a computer program for allowing a user to reliably view a scene regardless of the scene start time and end time notified by a scene notification message.

It is another object of the present invention to provide a broadcast program scene notification system and method, a mobile terminal device, and a computer program for reducing the processing load of the scene notification service providing side.

Means to Solve the Problems

A broadcast program scene notification system according to the present invention is a system that notifies a broadcast program scene to a terminal device that has a data communication capability and a broadcast reception/playback capability. The broadcast program scene notification system comprises registration means that registers desired-scene information, which identifies a scene in a broadcast program desired by a user of the terminal device, together with communication address information on the terminal device; broadcast means that broadcasts a program and, at the same time the program is broadcast, transmits an actual scene corresponding at least to a user's desired scene, with a predetermined time difference; and transmission means that checks if the actual scene appearing in a broadcast program corresponds to the desired scene and, if so, creates a notification message, which includes scene identification information identifying the scene and broadcast identification information on a time-difference broadcast of the scene, and transmits the created notification message to the user, wherein the notification message is created after the actual scene is generated and the notification message includes information that can identify at least a start time of the actual scene in the time-difference broadcast.

This system allows the user to view a scene by time-difference broadcast from the start of the scene even if the start time is already past in the real-time broadcast. This is especially useful for notifying a scene whose occurrence cannot be predicted. This system is based on the premise that the notification message is transmitted before the scene is not yet started in the time-difference broadcast. The scene identification information can be used to let the user know what the scene is like. Because the notification message used in the time-difference broadcast can be created after a scene is generated, the notification message may include information identifying at least the start time of the scene in the time-difference broadcast. The information identifying the start time may be the time-difference information of the time-difference broadcast transmitted at the same time the scene is started in the real-time broadcast or may be the time information created by adding the time difference to the start time.

The "broadcast reception/playback capability" in the present invention includes the capability to receive and play back the broadcast not transmitted by broadcast waves but generated by the IP technology, that is, the broadcast data not transmitted by the radio wave broadcast but generated by the communication infrastructure of a mobile terminal device.

A mobile terminal device according to the present invention comprises broadcast reception means that receives a broadcast; viewing means used to view the received broadcast; communication means that receives a notification message which includes scene identification information that identifies a scene corresponding at least to a part of a broadcast program and broadcast identification information on a time-difference broadcast of the scene; and control means that controls the broadcast reception means to receive the time-difference broadcast based on the notification message.

The control means controls the broadcast reception means to receive the time-difference broadcast based on the broadcast identification information on the time-difference broadcast of the scene notified by the notification message.

Another mobile terminal device according to the present invention comprises broadcast reception means that receives a broadcast; viewing means used to view the received broadcast; communication means connected to a communication network for receiving a notification message that includes scene identification information for identifying a scene corresponding at least to a part of a broadcast program and URL information for accessing a server in which scene data is stored; and control means that controls the communication means to access the server, in which data of the scene is stored by the communication means, based on the notification message.

The control means accesses the server based on the URL information for accessing the server in which data of the scene, notified by the notification message, is stored. This makes it possible to view a scene, whose end time is past, by receiving the stored data from the server.

A combination between the characteristics of both mobile terminal devices described above is that the notification message includes the scene identification information for identifying a scene corresponding at least to a part of a broadcast program, the broadcast identification information on the time-difference broadcast of the scene, and the URL information for accessing the server in which the scene data is stored. The control means controls the broadcast reception means to receive the time-difference broadcast, or allows the user to access the server, in which the data of the scene is stored, by the communication means, based on the notification message. More specifically, the notification message includes start/end time information on the scene and, if the scene can be viewed from the start time due to the time-difference broadcast depending upon a current time at which the user confirms the notification message, the start/end time of the scene, and the time difference of the time-difference broadcast, the user is prompted to view the time-difference broadcast and, otherwise, the user is prompted to access the server.

The mobile terminal device may further comprise recording means that records the broadcast wherein the recording means is started in addition to, or instead of, starting the viewing means.

A broadcast program scene notification method according to the present invention is a method that notifies a broadcast program scene to a terminal device that has a data communication capability and a broadcast reception/playback capability. The broadcast program scene notification method comprises the steps of: registering desired-scene information, which identifies a scene in a broadcast program desired by a user of the terminal device, together with communication address information on the terminal device; checking if the actual scene corresponds to the desired scene; transmitting a notification message, which includes start/end time information and broadcast identification information on a broadcast unit that includes the actual scene, to the user if the actual scene corresponds to the desired scene; and periodically transmitting the desired scene information by the broadcast during a broadcast period of the actual scene corresponding to the user's desired scene after starting a broadcast of the broadcast unit.

This broadcast program scene notification method and system transmit the notification message, which includes the start/end time information and the broadcast identification information on a broadcast unit including the actual scene, and periodically transmit the desired scene information by the broadcast during the broadcast period of the actual scene corresponding to the user's desired scene after starting the broadcast of the broadcast unit.

This configuration eliminates the need for transmitting a message notification to the user for each piece of desired scene information, transmits a message notification on a broadcast unit including the actual scene, and periodically broadcasts the desired scene information during the broadcast of the broadcast unit, thus indicating a period, during which the actual scene is continued, to the terminals of all users at the same time. That is, the terminal can view and/or record the actual scene depending upon the desired scene information transmitted by the broadcast if it matches the desired scene information stored in the terminal.

If the notification message is created after the scene is generated, the notification message may include information that can identify at least the start time of the scene in a time-difference broadcast. This information allows the terminal to recognize the start time of the scene in the time-difference broadcast.

A mobile terminal device responsive to a notification message comprises broadcast reception means that receives a broadcast; viewing means used to view the received broadcast; communication means connected to a communication network for receiving the notification message that includes broadcast unit identification information, which identifies a broadcast unit that includes a scene corresponding at least to a part of a broadcast program, and a start time and an end time of the broadcast unit; and control means that, in response to the notification message, starts receiving a broadcast by the broadcast reception means at the start time of the broadcast unit with a video and audio output function thereof suppressed and, after that, compares desired scene information received by the broadcast with desired scene information stored in the terminal, releases the suppression of the video and audio output function of the viewing capability while a match between both information is confirmed, and suppresses the video and audio output function of the viewing means again if the match is not confirmed.

The present invention may be implemented also as a computer program executed on a mobile terminal device or a server on which the functions described above are executed or by a recording medium storing the computer program therein.

Another mobile terminal device according to the present invention comprises broadcast reception means that receives a broadcast; viewing means used to view the received broadcast; communication means that receives a notification message that includes scene identification information, which identifies a scene corresponding at least to a part of a broadcast program, and start/end time information thereof; and control means that compares a current time with the start/end time of the scene when a user confirms the notification message and switches user-selectable processing based on a relation between the current time and the start/end time.

Even if the same notification message is received by this mobile terminal device, the user-selectable processing is switched depending upon the relation between the time the user confirms the notification message and the start/end time of the scene For example, when the current time is between a predetermined time earlier than the start time and the start time, the control means may prompt the user to immediately view the program.

When the current time is earlier than a predetermined time earlier than the start time, the control means may prompt the user to timer-record the scene.

When the current time is between the start time and the end time of the scene, the control means may prompt the user to select at least one of immediately viewing the program, viewing a time-difference broadcast of the scene, and accessing a server in which data of the scene is stored.

When the broadcast of the program is a digital broadcast, the time-difference broadcast may be lower than a corresponding real-time broadcast in an information amount per unit time. This provides the time-difference broadcast while preventing the quality of the real-time broadcast from being decreased in a limited frequency bandwidth.

In addition, when the current time is later than the end time of the scene, the control means may prompt the user to access a server, in which data of the scene is stored, by the communication means. In this case, the notification message preferably includes access information for accessing the server. This URL information may be server access information or server access information added with information for identifying the scene. Instead of the stored scene data, the control means may prompt the user to acquire the result information related to this actual scene. In this case, the notification message includes the URL of the result information.

The mobile terminal device further comprises display means as a part of the viewing means for listing contents of a plurality of received notification messages on a display screen, wherein when the user selects a display item of one of notification messages from the list, the control means may switch user-selectable processing depending upon a relation between the start/end time of the scene specified by the notification message and the current time. This display means displays a list of a plurality of notification messages at any given time after the notification message is received, allowing the user to select a desired scene.

The display means may display information, which indicates whether or not the user has viewed the scene, for each notification message on the display screen of the list. This information immediately tells the user which scene has been viewed and which scene has not yet been viewed.

Another broadcast program scene notification system according to the present invention is a system that notifies a broadcast program scene to a terminal device that has a data communication capability and a broadcast reception/playback capability. The broadcast program scene notification system comprises broadcast means that broadcasts a program; registration means, connected to the terminal device via a communication network, for registering desired-scene information, which identifies a scene in a broadcast program desired by a user, together with communication address information on the terminal device; scene information transmission means that checks if an actual scene appearing in a broadcast program corresponds to the desired scene and, if the actual scene corresponds to the desired scene, transmits scene information, which indicates to the user that a broadcast of the actual scene will be or has been started, to the terminal device of the user via the communication network; and a server having a database in which generated actual scenes are stored in such a way that the terminal device can access the actual scenes via communication; wherein the scene information transmission means creates a notification message and transmits the created notification message to the user, the notification message including broadcast identification information and start/end time information on a notifying scene as well as access information for accessing the server, in which data of the scene is stored, after the broadcast of the scene is ended.

The broadcast means transmits a time-difference broadcast in which at least a part of output of a real-time broadcast is delayed for a predetermined time and the scene information transmission means transmits the notification message to the user with time-difference broadcast identification information on the notifying scene added to the notification message.

Preferably, the addition of the time-difference broadcast identification information to the notification message is performed for the notification message created after a scene, whose generation time cannot be predicted, is generated.

The present invention may be implemented also as a computer program executed on a mobile terminal device or by a recording medium storing the computer program therein.

Other configurations and effects of the present invention will be described in detail in the after-mentioned embodiments.

EFFECTS OF THE INVENTION

The present invention allows the user to reliably view a scene regardless of the relation between the scene start time/end time, notified by a scene notification message, and the current time, especially when the user fails to immediately confirm the scene notification message.

In addition, the processing load of the scene notification service provider side can be reduced by transmitting a scene notification message to notify the user about the start/end time of each broadcast unit that includes a scene and, at the same time, by transmitting scene identification information via the broadcast during the scene broadcast period. The mobile terminal side can automatically output (or record) the actual scene after the scene notification message is confirmed. In addition, even from the time a broadcast unit that activates the broadcast reception capability is started to the time the broadcast unit is ended, the battery life of the mobile terminal can be saved by suppressing the video and audio output function in the periods other than the broadcast period of an actual scene corresponding to a desired scene.

BRIEF DESCRIPTION OF THE DRAWINGS

FIGS. 3(a) and (b) are diagrams showing an example of the configuration of a user/scene table and a reverse table stored in a user/scene information DB used in an embodiment of the present invention;

FIGS. 7(a) and (b) are diagrams showing a scene management table prepared for each program, for which the scene notification service is performed, in the embodiment of the present invention;

FIG. 11 is a flowchart showing scene information reception processing (2) executed on the terminal in the embodiment of the present invention;

FIG. 12 is a flowchart showing scene information reception processing (3) executed on the terminal in the embodiment of the present invention;

FIGS. 13(a) and (b) are diagrams showing an actual example of a scene notification message in the embodiment of the present invention;

FIGS. 16(a)-(d) are diagrams showing other examples of the display screens of the mobile terminal when the user confirms a scene notification message in the embodiment of the present invention;

FIGS. 20(a)-(f) are diagrams showing the switching mode of user-selectable processing that depends on the relation among the notified scene start time (stime) and end time (etime) and the message confirmation time in the embodiment of the present invention;

FIG. 30 is a diagram showing the system configuration used to describe an application of the system in FIG. 27.

EXPLANATIONS OF SYMBOLS

10 . . . Communication network, 20 . . . Mobile terminal, 30 . . . Broadcast station, 40 . . . Registration server, 42 . . . Scene management server, 46 . . . Message transmission server, 47 . . . Message box, 48 . . . stored data server, 48 . . . stored data server, 49 . . . Database (DB), 201 . . . Central control unit, 204 . . . Display control unit, 205 . . . Display unit, 206 . . . Communication unit, 207 . . . Operation unit, 208 . . . Flash memory, 209 . . . Clock unit, 210 . . . Bus, 211 . . . Antenna, 212 . . . Signal reception unit, 213 . . . Audio processing unit, 214 . . . Microphone, 215 . . . Speaker, 300 . . . Display screen, 301 . . . Button, 303 . . . Soft menu item, 304 . . . Timer record button, 305 . . . Time-difference broadcast button, 306 . . . Button, 307 . . . Instruction button, 400 . . . List display screen, 401-406 . . . List item, 411 . . . Unviewed icon, 412 . . . Viewed icon, 421 . . . List item, 422 . . . List item, 441 . . . User/scene table, 442 . . . Reverse table, 443, 443a, 443b . . . Scene management table, 510 . . . Screen example, 600 . . . List item table

BEST MODE FOR CARRYING OUT THE INVENTION

A preferred embodiment of the present invention will be described in detail below with reference to the drawings.

Figure 1:
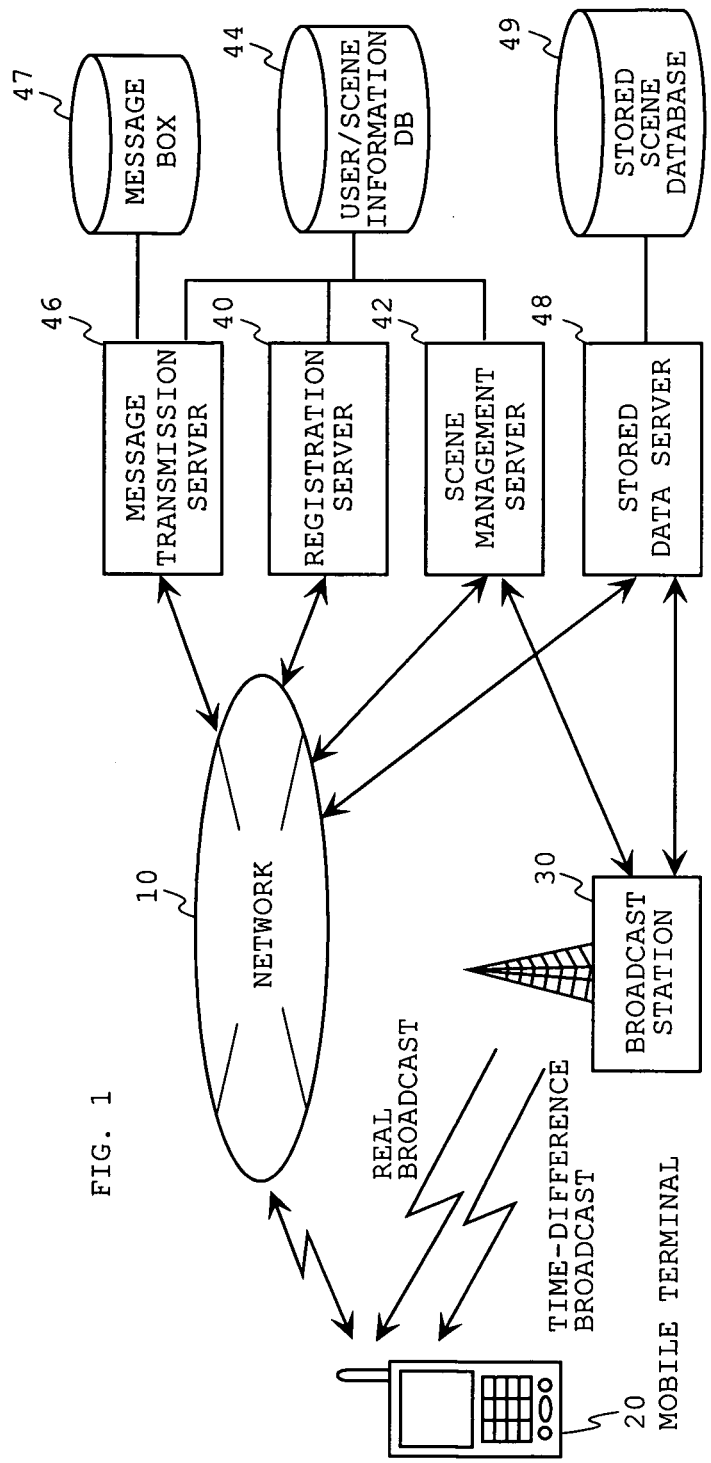
FIG. 1 is a diagram showing the general configuration of a broadcast program scene notification system of the present invention.

FIG. 1 shows the general configuration of a broadcast program scene notification system according to the present invention. A "program scene" or a "scene" in this specification refers to any given part of a broadcast program, for example, a sequence of parts containing a person or an object, which is considered to preferably be viewed by the user, and a shot including them.

This system comprises a mobile terminal 20 such as a mobile phone having the television broadcast reception capability, a broadcast station 30 that broadcasts a television program, various servers (registration server 40, scene management server 42, message transmission server 46, stored data server 48) that perform the processing related to a program scene in this embodiment, and a communication network 10 that includes a mobile phone network, a packet network, and the Internet.

The registration server 40 is a server that registers a user and a desired scene in response to a request from a user who wants to receive the broadcast program scene notification service. The scene management server 42 is a server that saves and manages various types of attribute information on an actual scene in a broadcast program. The "actual scene" is a scene in contrast to a conceptual "desired scene" and is a concrete scene that is actually generated (or will be generated) in a program.

The message transmission server 46, connected to a message box 47 in which messages to be sent are temporarily stored, sends a message to the mobile terminal 20 at a predetermined time via the network 10. Unless otherwise stated, a "message" in this specification includes a relatively short message, the so-called a short message, that is transferred with a telephone number as the communication address information and an electronic mail (also simply called mail) that is transferred with an electronic mail address as the communication address information.

The scene management server 42 is connected to the broadcast station 30 to receive the input of a program or scene information. This connection, which is supposed to be via a leased line, may be also made via the network 10.

The registration server 40, scene management server 42, message transmission server 46 share a user/scene information DB 44.

The stored data server 48 stores broadcast actual scenes in a database 49 and provides an actual scene corresponding to a desired scene, as data in response to an external access via the network 10.

The mobile terminal 20, typically a mobile phone, may be a PDA (Personal Digital Assistant), a game device, or a car navigation device that has the data communication capability and the broadcast reception/playback capability.

The network 10 includes a message server that performs intermediary processing for transferring a short message or a mail server that performs intermediary processing for transferring electronic mail though they are not shown in the figure. Although the registration server 40, scene management server 42, message transmission server 46, and stored data server 48 are supposed to be installed at the same location, they need not necessarily be at the same location. The location may or may not be in the same location as that of the broadcast station 30. The content of the user/scene information DB 44 and the operation of the components shown in FIG. 1 will be described below.

The broadcast station 30 delivers not only the regular broadcast (real-time broadcast) of a program but also the time-difference broadcast that broadcasts the same program, in part or in whole, by delaying for a predetermined time. Although the broadcast delivered by the broadcast station 30 is supposed to be a terrestrial digital broadcast (including the so-called one-segment broadcast and three-segment broadcast), the present invention may be applied also to a satellite broadcast or to an analog broadcast. An example of the time-difference broadcast is disclosed, for example, in Patent Document 4.

Figure 2:
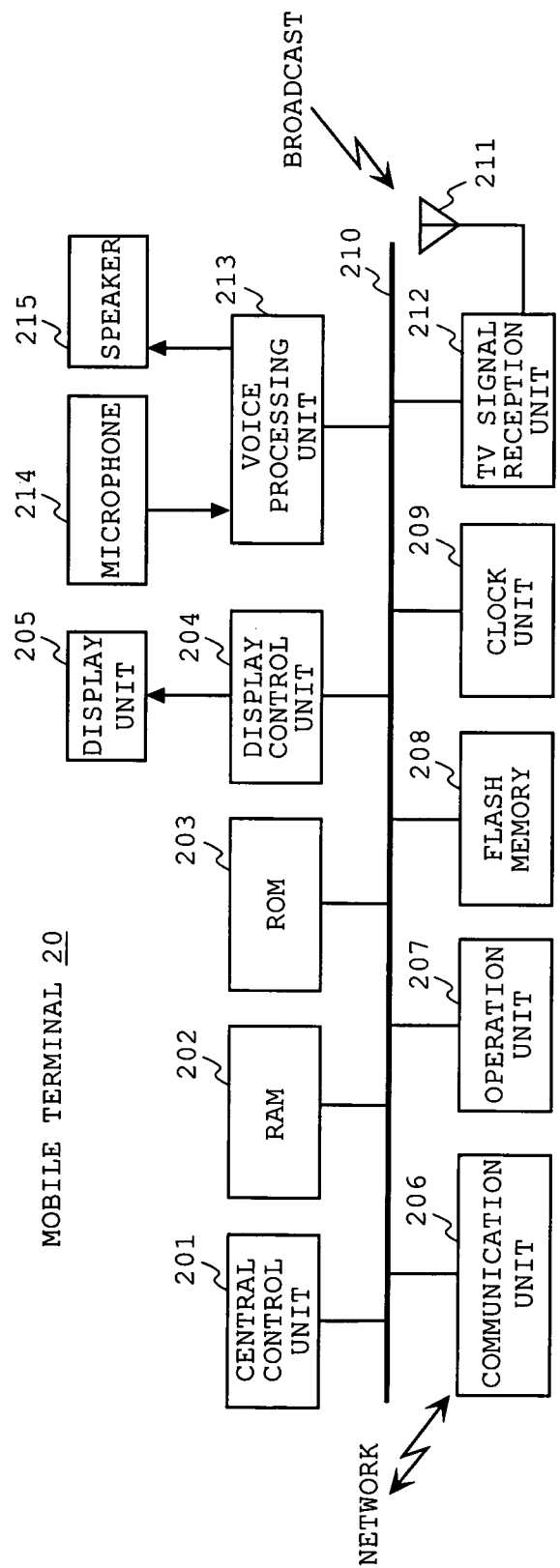
FIG. 2 is a diagram showing an example of the general hardware configuration of a mobile terminal shown in FIG. 1.

FIG. 2 shows an example of the general hardware configuration of the mobile terminal 20. This television device comprises a central control unit 201, a RAM 202, a ROM 203, a display control unit 204, a display unit 205, a communication unit 206, an operation unit 207, a flash memory 208, a clock unit 209, an antenna 211, a TV signal reception unit 212, an audio processing unit 213, a microphone 214, and a speaker 215.

The central control unit 201, RAM 202, ROM 203, display control unit 204, communication unit 206, operation unit 207, flash memory 208, clock unit 209, TV signal reception unit 212, and audio processing unit 213 are connected to a bus 210 via which data and commands are sent and received.

The RAM 202 is a memory in which the operation result of the central control unit 201 and data (including notification message that will be described below) acquired from an external source are temporarily stored. The ROM 203 is a non-volatile memory in which the operating system (OS) and various programs are saved. The central control unit 201 reads those programs from the ROM 203 and, according to the programs, executes predetermined processing. The flash memory 208 is a rewritable non-volatile memory in which data acquired from an external source and information such as mail addresses and URL (Uniform Resource Locator) are saved for later use.

The communication unit 206 has the function that establishes a connection with the network 10 for sending and receiving data to or from the network 10. The operation unit 207 has a ten-key pad and various instruction keys for providing user input interface.

The display control unit 204 has the function that receives display information, such as text and images, from the central control unit 201 and, based on the received information, drives the display unit 205. The display control unit 204 can switch between, or overlap, display information from an external source, that is, information received from the network and information received via broadcasting, for displaying. The display unit 205, which is any display device such as a liquid crystal device or an organic EL device, has the function that optically displays an image according to the driving signal from the display control unit 204.

The TV signal reception unit 212 has the function that extracts the signals of a desired channel from broadcast waves received by the antenna 211 and demodulates the signals for playback. The TV signal reception unit 212 includes the browser function that interprets a BML (Broadcast Markup Language)-described document sent via a digital broadcast. The audio processing unit 213 performs processing for causing the speaker 215 to output voice and for converting an input voice received from the microphone 214 to a predetermined signal. The TV signal reception unit 212 may include broadcast recording means. In this case, the storage unit for recording may be the RAM 202, the flash memory 208, or a small HDD not shown. The clock unit 209, which includes a real-time clock, provides functions of the calendar, clock, and timer.

Although not shown in the figure, each of the internal configuration of the registration server 40, scene management server 42, and stored data server 48 shown in FIG. 1 is a computer device comprising the central control unit, communication unit, storage unit, and various input/output devices.

FIGS. 3(a) and 3(b) show examples of the configuration of a user/scene table 441 and a reverse table 442 stored in the user/scene information DB 44 used in the embodiment of the present invention. The user/scene table 441 is a data table which contains the communication address information (telephone number and mail address in this example) and the desired scene ID, which is scene identification information for identifying a desired scene, for each registered user who receives the broadcast program scene notification service in this embodiment. This registration site is on a web site and, as will be described below, the user can perform user registration and desired scene registration on the web page. When a scene is notified only by a short message, the user/scene table 441 need not include the Mail Address column. Conversely, when a scene is notified only by electronic mail, the table need not include the Telephone Number column.

A user's telephone number is managed by the mobile phone operator side and, so, the server can recognize a mobile phone number based on the unique ID (terminal ID) information sent from the mobile phone. It is also possible that, when the correspondence between unique ID information and a mobile phone number is not known, the server side may send the unique ID information into the mobile phone operator when a scene notification is sent via a short message to request the mobile phone operator to convert the unique ID information to the corresponding telephone number. The unique ID in that case is thought of as one type of communication address information of the present invention. Because the correspondence between mail addresses and mobile phone numbers is managed also by the mobile phone operator side, the server side can recognize a mail address based on the unique ID information but it is also possible to request the user to enter the user's mail address.

The reverse table 442, a data table created from the user/scene table 441, is a table in which, for each desired scene ID, all user IDs of users desiring the scene are registered. This table is updated each time the user/scene table 441 is updated. Note that the reverse table 442 is not necessary if the users, to whom a notification is to be sent, are searched for from the user/scene table 441 each time a notification for a scene is generated. However, the reverse table 442, if prepared in advance, can reduce the search processing time.

The following describes the operation of this embodiment. The operation is divided roughly into the registration stage in which the user registers a desired scene for which the user wants to receive a notification, the management stage in which the scenes occurring in a broadcast program are classified for managing scene information, the notification stage in which scene information on a real scene corresponding to a desired scene is notified to the user, and the viewing stage in which the user views a broadcast program scene based on received scene information. As will be described below, the viewing stage is divided further into the real-time broadcast viewing stage, the time-difference broadcast viewing stage, the stored data viewing stage, and their recording stage.

Figure 4:
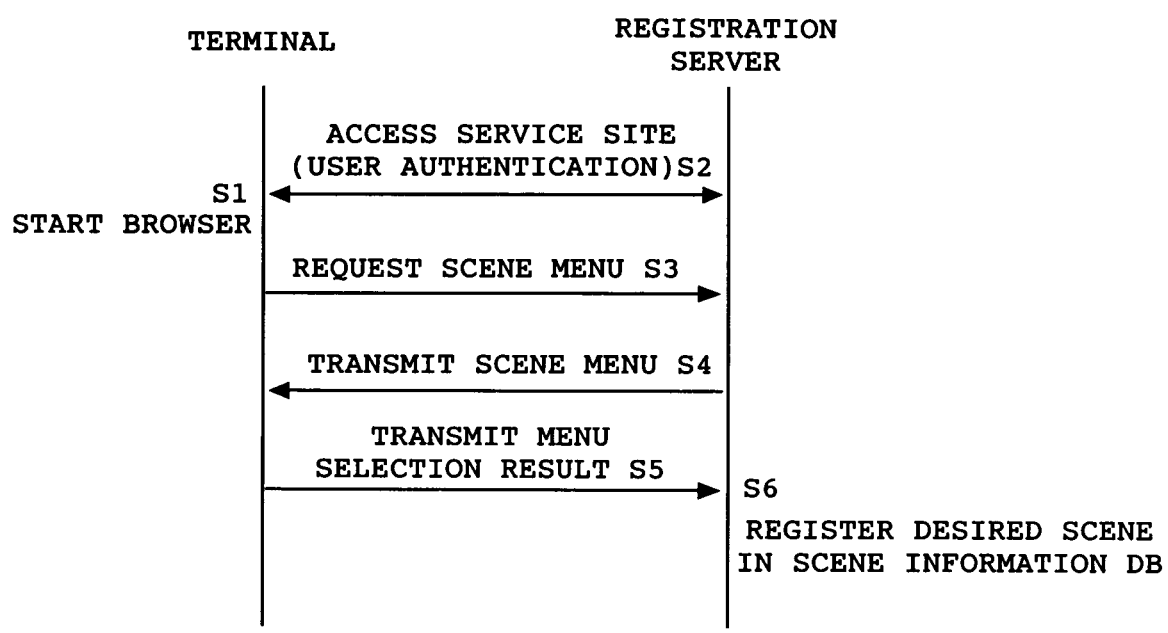
FIG. 4 is a diagram showing the processing of a terminal and a scene registration server in the registration stage in which a desired scene, for which the user wants to receive a notification, is registered.

FIG. 4 shows the processing performed by the terminal and the scene registration server in the registration stage in which the user registers a desired scene for which the user wants to receive a notification. The terminal starts the web browser (S1) and accesses the scene registration server on the site that provides the scene notification service in this embodiment (S2). In response to a scene menu request from the user (S3), the server sends the scene menu to the terminal (S4). When the user selects a desired scene from this scene menu, the selection result is sent to the server (S5). Based on the received selection result, the server updates the content of the user/scene information DB 44 (S6). When the user is registered, the user information (and password as necessary) is registered. When a user password is registered, the user is requested to enter a password in step S2 described above for user authentication.

Instead of accessing such a web site, user registration may also be performed separately using a dedicated application program.

Figure 5:
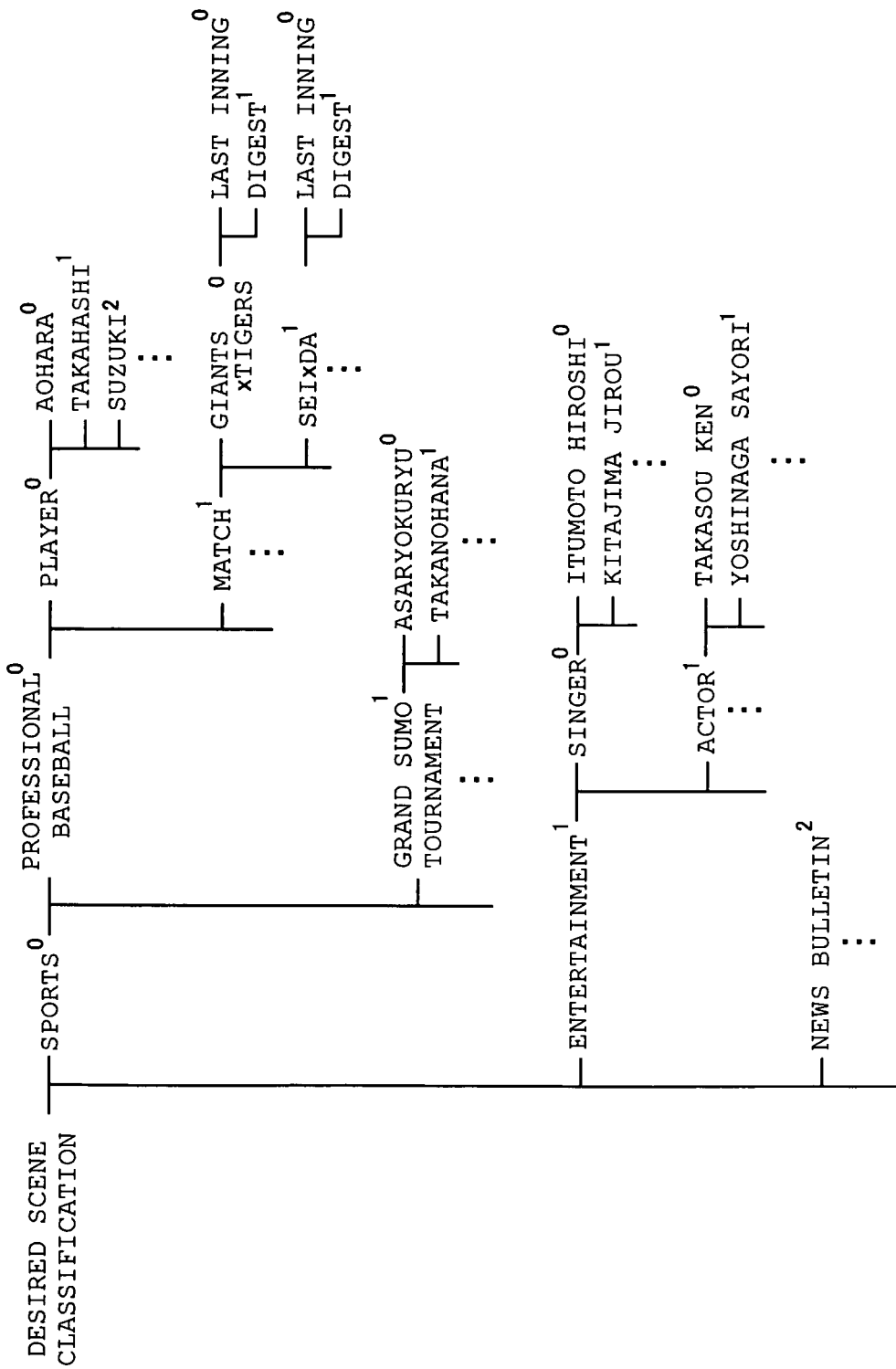
FIG. 5 is a diagram showing an example of the hierarchical classification of desired scenes prepared in advance in the embodiment of the present invention.

FIG. 5 shows an example of the hierarchical classification of desired scenes prepared in advance. Those desired scenes, which are supposed to be viewed by a relatively large number of users, are classified according to genre. The numerical value placed to the upper-right of an item in each hierarchy level indicates the digit value of a classification code. The numeric value string, formed by the numbers from the highest layer through lower layers traced down to an item, is the classification code of the item. In the example in the figure, the classification code of "last inning of Giants vs. Tigers" is 00100. This classification assumes many scenes, for example, the at-bat scene of a specific professional baseball player, only the last inning between specific teams or its digest, the bout of a favorite sumo wrestler of the grand sumo tournament, the result of soccer games, the stage appearance of a specific singer in a popular song program, the scene in which a specific actor appears in a drama, and a flash news bulletin. Although classified according to genre, the desired scenes may also be classified according to the programs of a specific broadcast station so that the user can select an actor or a scene of each program.

Figure 6:
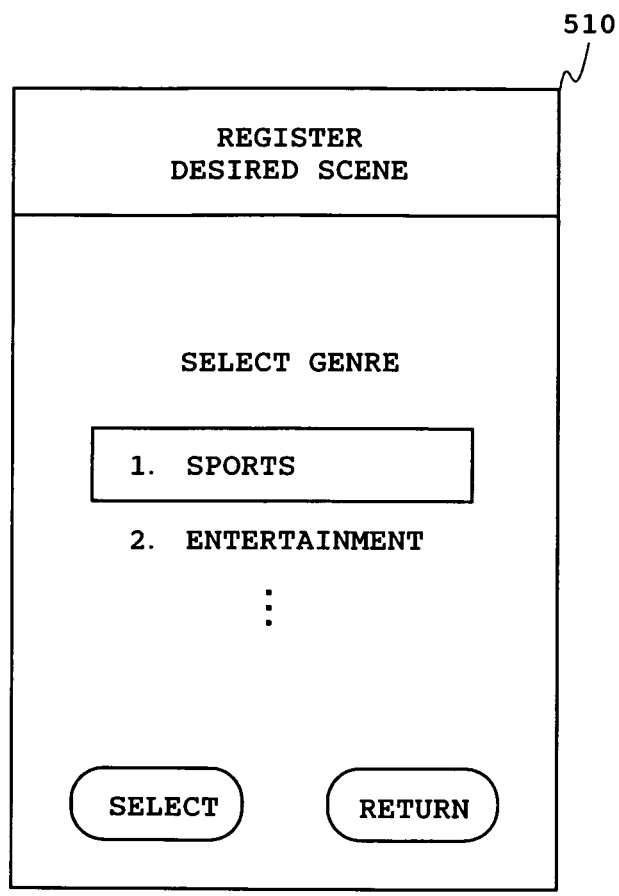
FIG. 6 is a diagram showing an example of the screen of the mobile terminal displayed when a desired scene is registered in the embodiment of the present invention.

FIG. 6 shows an example of a screen 510 displayed on a mobile terminal for registering a desired scene. This screen allows the user to sequentially select menu items, beginning at the highest layer of the classification of the desired scenes shown in FIG. 5. This screen is sequentially switched for selecting lower-layer items though an example of subsequent screens is omitted here. If the user has a plurality of desired scenes, the user repeats the registration processing.

Instead of providing the scene menu from the registration server side to the user for selecting from it as described above, it is also possible to allow the user to enter any keyword which is checked by the registration server side based on the entered keyword for identifying the corresponding desired scene.

Next, the following describes the management stage in which the scenes appearing in a broadcast program are classified for managing scene information. In this embodiment, the operator determines whether or not a scene, from which scene information is to be extracted, is generated in a program and its scene attribute (genre and title of the scene), and the scene management server 42 registers the determination result in the user/scene information DB 44.

The implementation of the scene notification service differs slightly between a live broadcast program and a taped broadcast program.

In the case of a taped broadcast, the presence of an actual scene corresponding to a desired scene and its generation time can be confirmed in advance. Therefore, the scene information on various scenes can be registered in advance. In this case, if scene identification information is added to each scene in a digital broadcast program, it is also possible to automatically obtain scene information based on that information.

In contrast, in the case of a live broadcast, the generation of an actual scene corresponding to a desired scene and its generation time are unpredictable. Depending upon the type of a desired scene, the generation and its generation time can be sometimes predicted in advance. For example, the schedule of the live broadcast of a popular song program is fixed in advance and a time at which a specific singer appears can be predicted fairly accurately. In such a case, the scene information can be entered as predicted data (The user's agreement should be obtained in advance at service-usage registration time that scene information generated based on the prediction sometimes results in a mismatch). For example, it is usually difficult to predict the generation time of the plate appearance of a specific professional baseball player and, in this case, the operator enters the scene information in real time when, or immediately before, the announcement is made that the player goes to the batter's box.

A notification cannot be issued for an event whose generation time cannot be predicted. For example, the generation time of a homerun during the live broadcast of the baseball cannot be predicted and, so, the scene notification cannot be issued in advance. However, the following action can be taken if a scene notification may be issued after the generation of an actual event. That is, the scene notification information on a scene, which was broadcast immediately before, may include the channel information and the broadcast start/end date and time (simply called start/end time) of the scene as well as information (for example, URL information) for viewing the time-difference broadcast or the stored data viewing, which will be described below, so that the user can view the already-broadcast scene after its generation. If the channel of the real-time broadcast, for which the scene notification service is provided, is fixed, there is no need for the scene notification information to include the channel information on the real-time broadcast.

FIGS. 7(a) and 7(b) show scene management tables 443a and 443b (generically 443) prepared for each program for which the scene notification service is provided. In this embodiment, those tables are stored also in the scene information DB 44. The scene management table 443 has items "Scene ID" that identifies each scene in a program, "Desired scene ID" (corresponding to a classification code in FIG. 5) to which this scene corresponds, "Title" that is identification information that can be understood by the user, a broadcast channel (CH), and "Start time" and "End time" of the scene. Instead of the end time, the duration time from the start to the end of the scene may also be used. In that case, the end time can be calculated from the start time and the duration time.

FIG. 7(a) shows the scene management table 443a about the live broadcast program of the baseball. In this case, because the at-bat scene of a specific player is known only immediately before the appearance due to the characteristics of the program, the scene information is serially generated by the operator's operation at a specific time after the program is started. For example, a sequence number is sequentially generated as "Scene ID" in order of scene information generation. "Corresponding desired scene ID" is determined by an operator's instruction (for example, the selection of a menu item or a button). In this example, a combination of the program title and the corresponding desired scene name is automatically generated as "Title". "CH" is the number of channel via which the program will be broadcast. "Start time" is a past time if the scene information is entered after confirming the generation of a scene. If the generation of a scene can be predicted accurately and if the time can be predicted, "Start time" can also be determined by the operator entry of the prediction time (for example, in scores of seconds or in several minutes from now). In this example of the scene, "End time" is left blank or an approximate predicted end time is entered therein. For example, if the broadcast of the digest of a baseball game broadcast is determined in advance, the scene information may be generated in advance including the planned start time and end time of the scene.

If what scene will be generated and its start time and its end time can be predicted in advance for the scene management table 443b of the live-broadcast popular song program in FIG. 7(b), the scene information can be set in advance. If they cannot be predicted, the operator enters them immediately before or immediately after the scene is generated.

Next, the following describes the notification stage in which scene information on an actual scene corresponding to a desired scene, is notified to the user.

Figure 8:
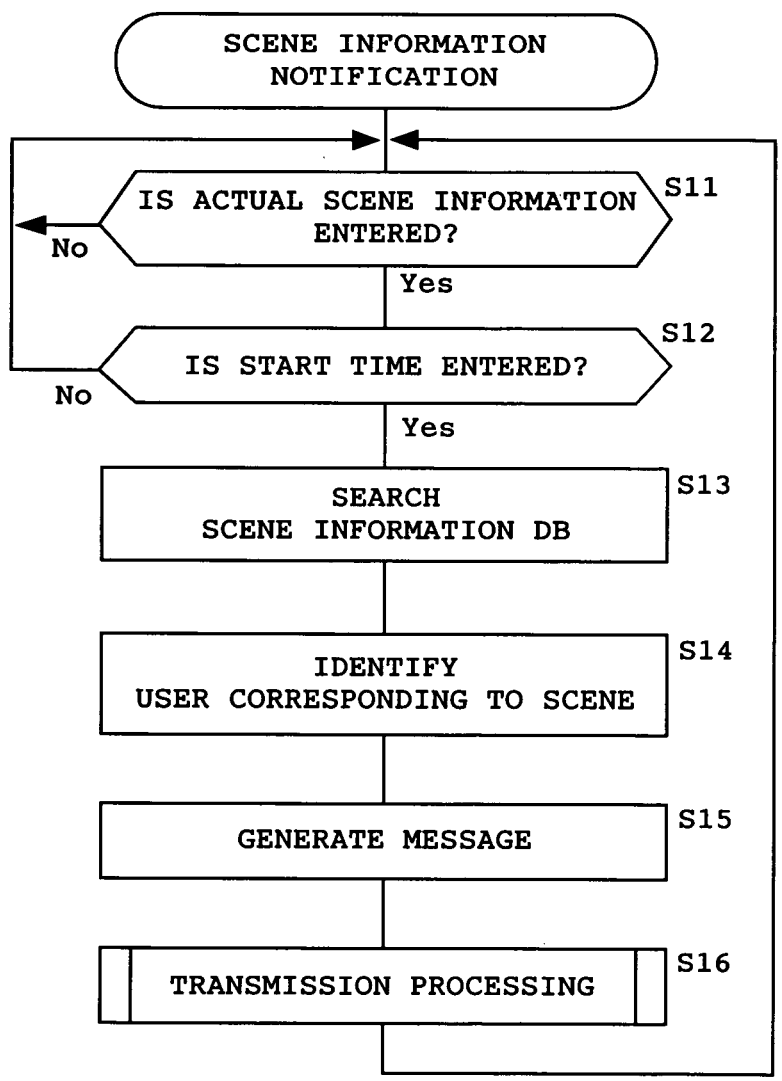
FIG. 8 is a flowchart showing the scene information notification processing executed by a message transmission server in the embodiment of the present invention.

FIG. 8 is the flowchart of scene information notification processing executed by the message transmission server 46. If actual scene information is entered, for example, through the operation of an operator (S11, Yes) and if the start time of the scene is entered (S12, Yes), the message transmission server 46 searches the scene information DB 44 (S13). Otherwise, control is passed back to step S11. A user corresponding to the scene (the user who wants to receive a notification) is identified by searching the user/scene information DB 44 (S14). A message notifying the scene information to the user is generated (S15). This message is stored temporarily in the message box 47 (FIG. 1). The content of the scene information that is notified is typically the scene title information, broadcast CH information, broadcast start time, broadcast end time, and stored data access information. Next, the scene information is transmitted to the user (S16).

Figure 9A:
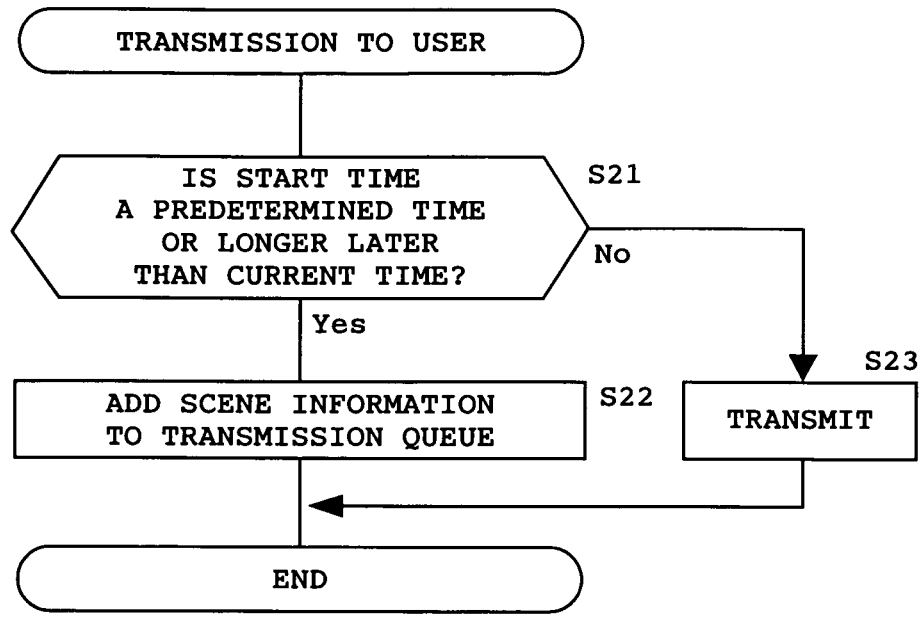
FIGS. 9(a) and (b) are diagrams showing the actual content of transmission processing (a) and the actual content of timer interrupt processing (b) for a transmission queue in step S16 in FIG. 8.

FIG. 9(a) shows the actual content of the transmission processing in step S16 in FIG. 8. First, a check is made if the scene start time is a predetermined time (for example, several minutes) later than the current time (S21). If Yes, the scene information is added to the queue (S22). If No, the scene information is sent immediately to the user by a short message or by mail (S23). Although not shown in the figure, the queue is a concatenation of pointers to scene information. Preferably, the scene information should be sorted in the queue in order of start times. If the determination result of step S21 is No, the scene start time that is a past time is also included. Note that, if whether or not a notification is already issued is managed, the determination in step S21 can be made based on the scene management table 443 (FIG. 7(b)) and, so, the transmission queue is an element that is not always required for the present invention. Depending upon the type of a scene or the user's request, the scene information may be immediately sent to the user even if the start time is a predetermined time or longer later than the current time. If desired by the user, the immediate transmission is registered when a desired scene is registered.

Figure 9B:
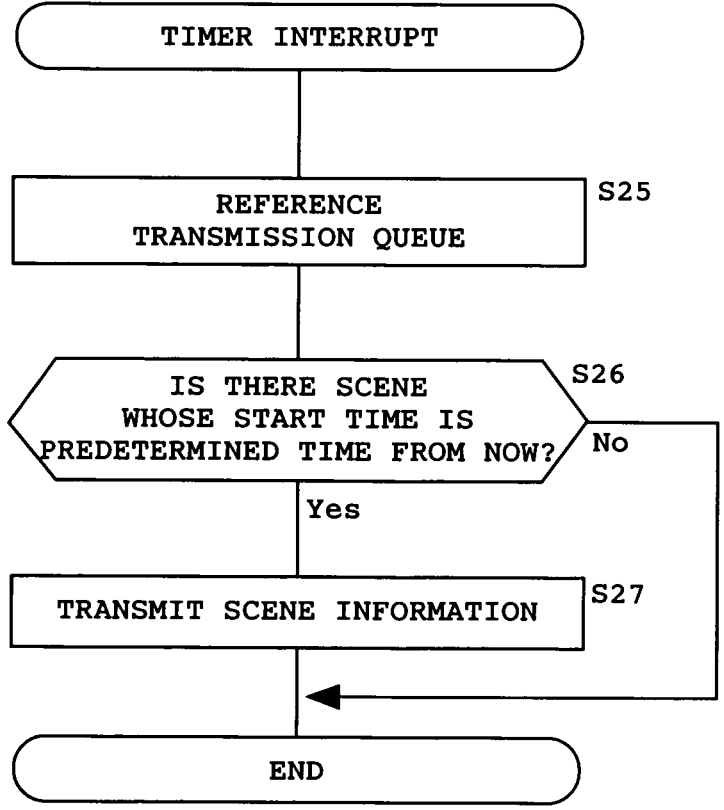

FIG. 9(b) shows the timer interrupt processing for the transmission queue. This processing is started periodically. This period is several seconds to scores of seconds long and is one minute at the longest. A shorter period increases the processing load but improves the responsiveness. Conversely, a longer period lightens the processing load but deteriorates the responsiveness. Therefore, the period should be determined with the tradeoff between the processing load and the responsiveness taken into consideration. First, the message transmission server references the transmission queue (S25). The message transmission server checks if there is a scene whose start time is a predetermined time later from now (for example, one minute later) (S26). In this determination, the result is Yes for a scene that will be started in a predetermined time or shorter, or for a scene already started. For a scene whose determination result is Yes, the scene information is sent to the user by a short message or by mail (S27).

Next, the following describes the viewing stage in which the user views a scene based on the received scene information.

Figure 10:
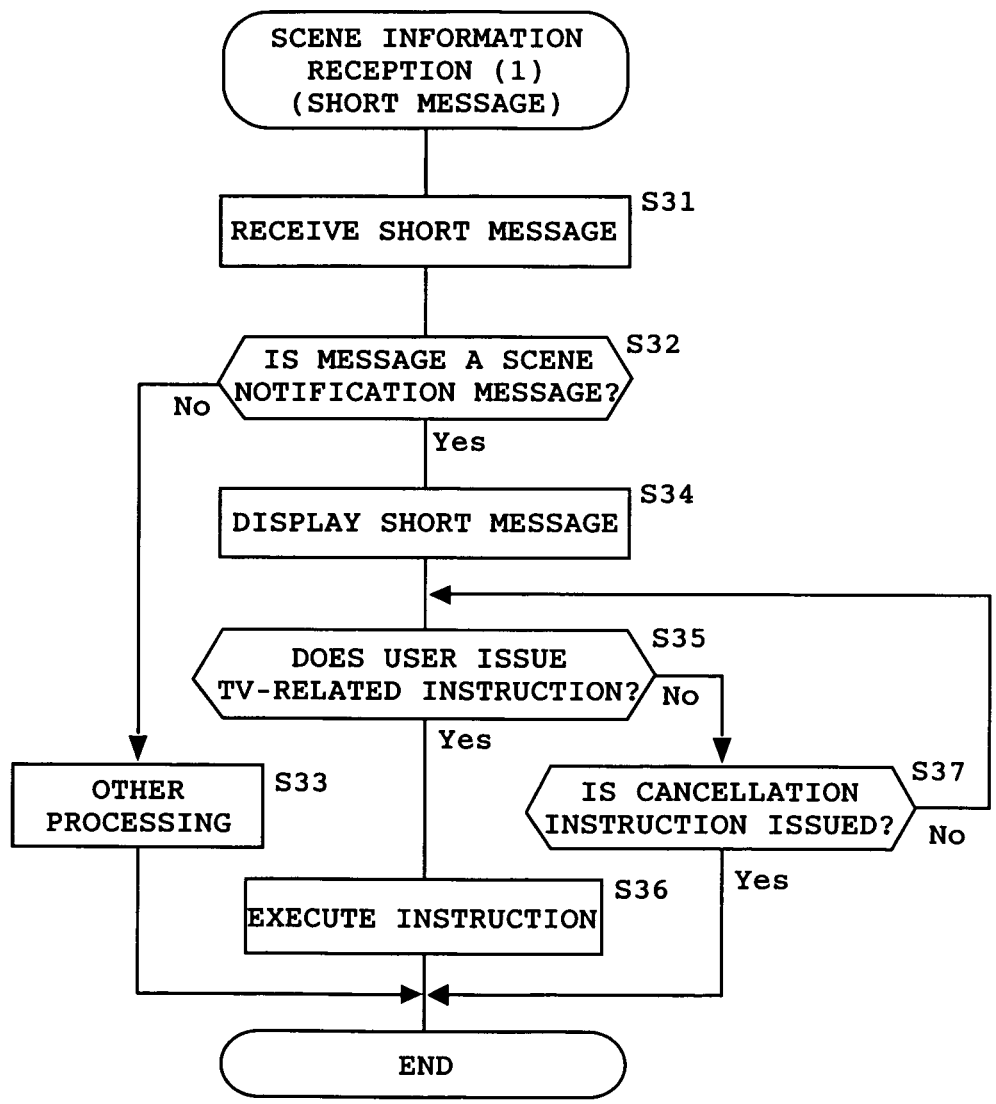
FIG. 10 is a flowchart showing scene information reception processing (1) executed on the terminal in the embodiment of the present invention.

FIG. 10 shows a flowchart of scene information reception processing (1) executed on the terminal. The processing shown in the figure is executed when a message is sent by a short message. When a message is received (S31), the terminal checks if the message is a scene notification message (S32). This is determined by the presence or absence of a predetermined character string or scene information in the message (including not only message text but also attribute information associated with the message). If the message is not a scene notification message, usual other processing is performed (S33). If the message is a scene notification message, the message including the scene information is displayed on the display unit (S34). This message may be displayed on the sub-display unit if the mobile phone is a folding-type mobile phone that has a sub-display unit in addition to the main display unit and if the mobile phone is folded. When the user performs an operation (for example, press a predetermined key) to issue a TV-related instruction (for example, time recording, real-time broadcast viewing, time-difference broadcast viewing, stored data access, etc.) (S35, Yes), the terminal executes the TV-related instruction (S36). When the user issues a cancellation instruction operation (S37, Yes), this processing is terminated. This processing may also be terminated, not when the cancellation instruction is issued, but when a predetermined time elapses and a timeout occurs.

FIG. 11 shows the flowchart of scene information reception processing (2) executed on the terminal. The processing shown in the figure is executed when a message is sent by mail. When mail is received (S41), the terminal checks the header information (S42). In this example, it is assumed that the mail header information includes information indicating a scene notification message. If this mail is not a scene notification message (S43, No), usual other processing is performed (S44). If this mail is a scene notification message, the mail text including the scene information is displayed on the display unit (S45). When the user executes a TV-related instruction operation, such as the one described above, for this screen as in the processing in FIG. 10 (S46, Yes), the terminal executes the TV-related instruction (S47). When the user issues a cancellation instruction operation (S48, Yes), this processing is terminated.

FIG. 12 shows the flowchart of scene information reception processing (3) executed on the terminal. The processing shown in the figure is executed when the message is sent by mail, but the scene notification message is included, not in the header, but in the text. The terminal receives the mail (S51). If the mail is opened (S52) and the text of the opened mail includes scene information, the terminal receives a TV-related instruction (S53) from the user and executes the TV-related instruction (S54). If the user performs a cancellation instruction operation (S55, Yes), this processing is terminated. Note that the mail open check (S52) step is not always necessary but the TV-related instruction (S53) may be executed to execute the subsequent processing. Even if the cancellation instruction operation is performed by the user in the processing described above (S37, Yes/S48, Yes/S55, Yes), the TV can be started not directly by the scene notification message but by an instruction issued via an icon or a menu.

The following describes actual examples of various modes of actual scene viewing corresponding to various types of TV-related instruction and corresponding to user's desired scenes.

FIGS. 13(a) and 13(b) show actual examples of scene notification messages in this embodiment. In this example, a notification message is represented by a tag name that is a predefined, predetermined character string. The notification message in FIG. 13(a) includes the tag name, medium information, broadcast start time (stime), broadcast end time (etime), broadcast identification information, time-difference broadcast identification information, scene identification information (title), and storage URL. "Tag name", for example, "media:", represents a command that starts the medium (television, radio, etc.) specified by "Medium information". "Broadcast identification information" indicates the channel of the real-time broadcast that broadcasts a program including an actual scene corresponding to a desired scene. "Time-difference broadcast identification information" indicates the channel of the time-difference broadcast that broadcasts a program including the corresponding actual scene. "title" is the name of the scene assigned to the actual scene. "storage URL" is access information for accessing the stored data of the actual scene. The storage URL may include identification information on the actual scene or may notify only the URL of the server to the user to allow the user to select a desired actual scene in the server. In addition, when scene information is accessibly stored in the server, not in units of scenes, but in larger units, for example, in units of programs, it is also possible that the start (or end) time of the scene is notified to the server to identify the scene so that the server can extract the scene according to the notified time.

When a scene that occurred is notified immediately after the occurrence, a notification message in which the real-time broadcast identification information is not added, such as the one shown in FIG. 13(b), is possible. In either case, when the time-difference broadcast identification information is included, numeric information representing the time difference may also be included. This information allows the terminal to recognize the actual start time of the scene via the time-difference broadcast.

Figure 14A:
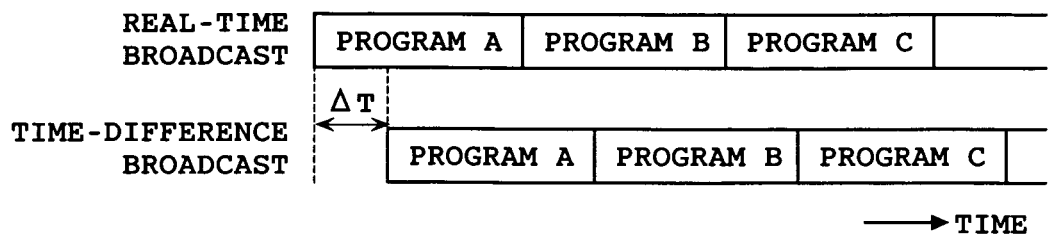
FIGS. 14(a)-(c) are diagrams showing the mode of a time-difference broadcast in the embodiment of the present invention.
Figure 14B:
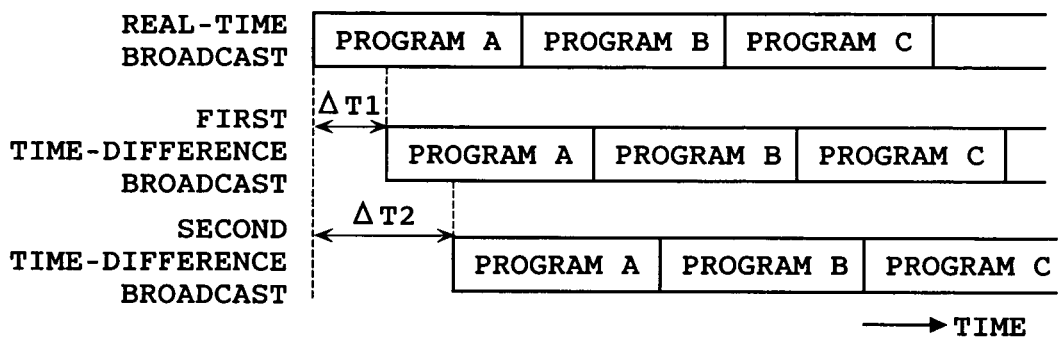
Figure 14C:
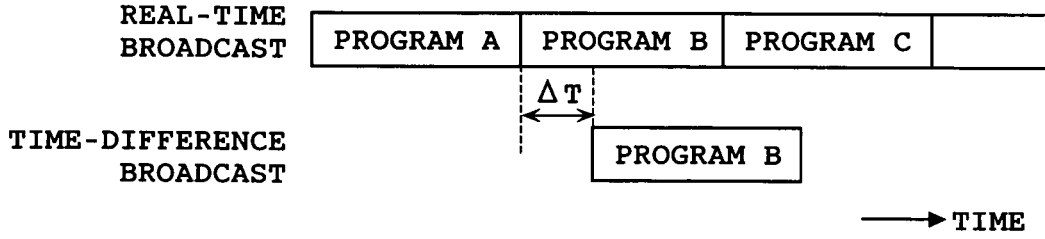

The following describes the mode of the time-difference broadcast in this embodiment with reference to FIGS. 14(a)-(d). Basically, as shown in FIG. (p), the time-difference broadcast refers to a broadcast that broadcasts the same content as that of the corresponding real-time broadcast via a separate channel with a predetermined delay time (T) from the real-time broadcast. As shown in FIG. 14(b), a plurality of time-difference broadcasts with the same content may be broadcast in parallel with different delay times (for example, T1, T2). As shown in FIG. 14(c), the time-difference broadcast may be executed, not for the real-time broadcast in its entirety, but for a part of the programs (or a scene in a program). In addition, the information amount per unit time of the time-difference broadcast may be lower than that of the corresponding real-time broadcast. This makes it possible to provide a configuration in which the bandwidth of the so-called one-segment broadcast for a mobile terminal is divided between the real-time broadcast and the time-difference broadcast without significantly decreasing the image quality of the real-time broadcast. Programs A, B, and C in FIGS. 14(a)-(d) may be scenes.

FIG. 15(a)-(d) show examples of a display screen 300 of a mobile terminal used by the user to confirm a received scene notification message.

Figure 15A:
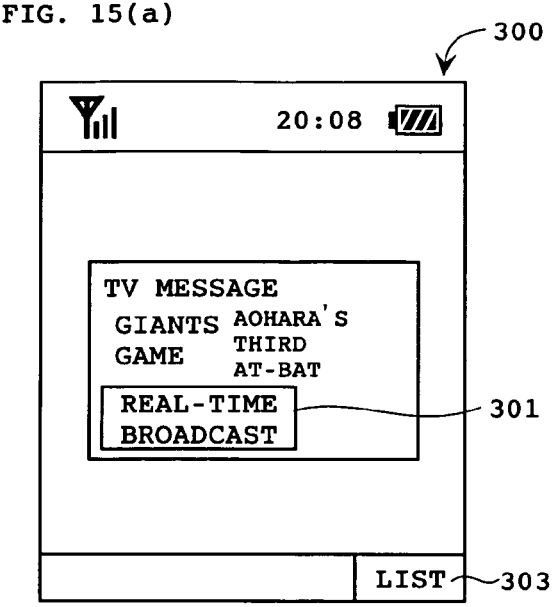
FIGS. 15(a)-(d) are diagrams showing examples of the display screens of the mobile terminal when the user confirms a received scene notification message in the embodiment of the present invention.

FIG. 15(a) shows an example of the screen displayed when the user confirms a scene notification message notifying an actual scene that will occur immediately after the screen is displayed. The title of the actual scene, a button 301 indicating the viewing "real-time broadcast", and a soft menu item 303 that displays "list" are displayed on this screen.

Figure 15B:
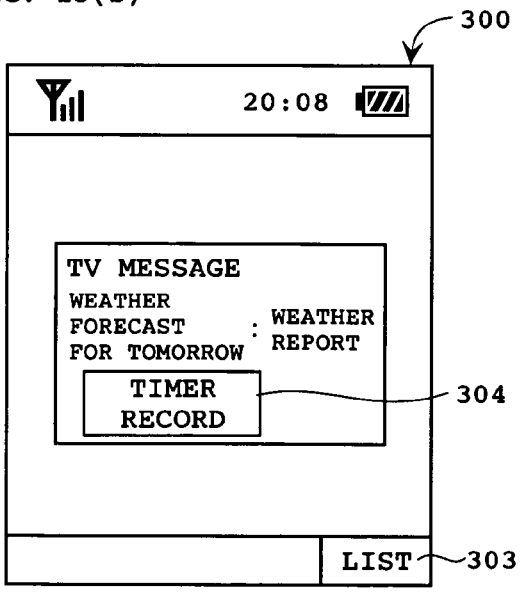

FIG. 15(b) shows an example of the screen that presents the user with a Timer record button 304 that allows the user to select the timer recording of the scene when the current time is earlier than the time that is the predetermined time earlier than the start time. Timer recording, if set, starts the television at the start time for automatically recording the real-time broadcast. The video and the audio, though not required to be output during the execution of recording, may be output at the same time the scene is recorded if the user specifies the output of them at initialization time or issues the corresponding instruction.

Figure 15C:
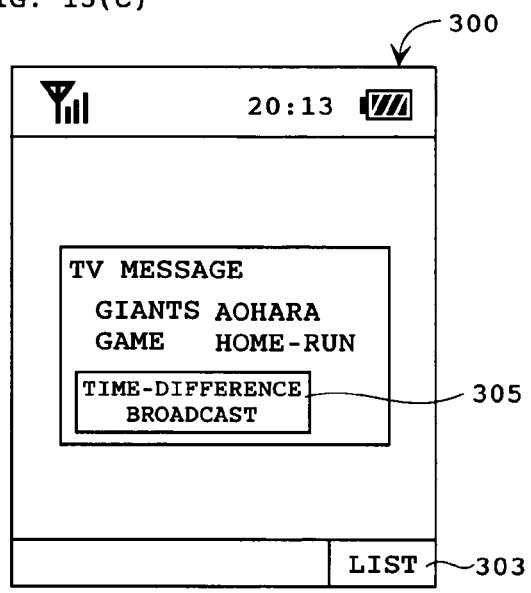

FIG. 15(c) shows an example of the screen that provides a Time-difference broadcast button 305 for use when, upon receiving a scene notification message immediately after the generation of an actual scene whose generation time cannot be predicted such as a baseball homerun scene, the user can confirm the actual scene by the time-difference broadcast at the current time of the confirmation time. Although not shown, the actual start time in the time-difference broadcast may also be displayed.

Figure 15D:
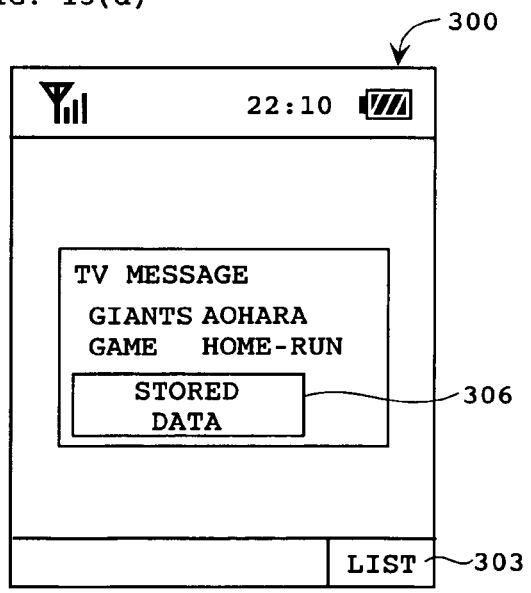

FIG. 15(d) shows an example of the screen that provides the user with a button 306 for accessing the stored data when the user confirms the notification message shown in FIG. 15(c) too late to confirm the actual scene by the time-difference broadcast.

FIGS. 16(a)-(d) show other examples of the display screen of a mobile terminal used by the user to confirm a scene notification message on a mobile phone having the timer recording function. Instead of viewing the scene immediately, a "Record" instruction button 307 is added in FIGS. 16(a), (c), and (d). FIG. 16(b) is the same as FIG. 15(b).

Figure 17:
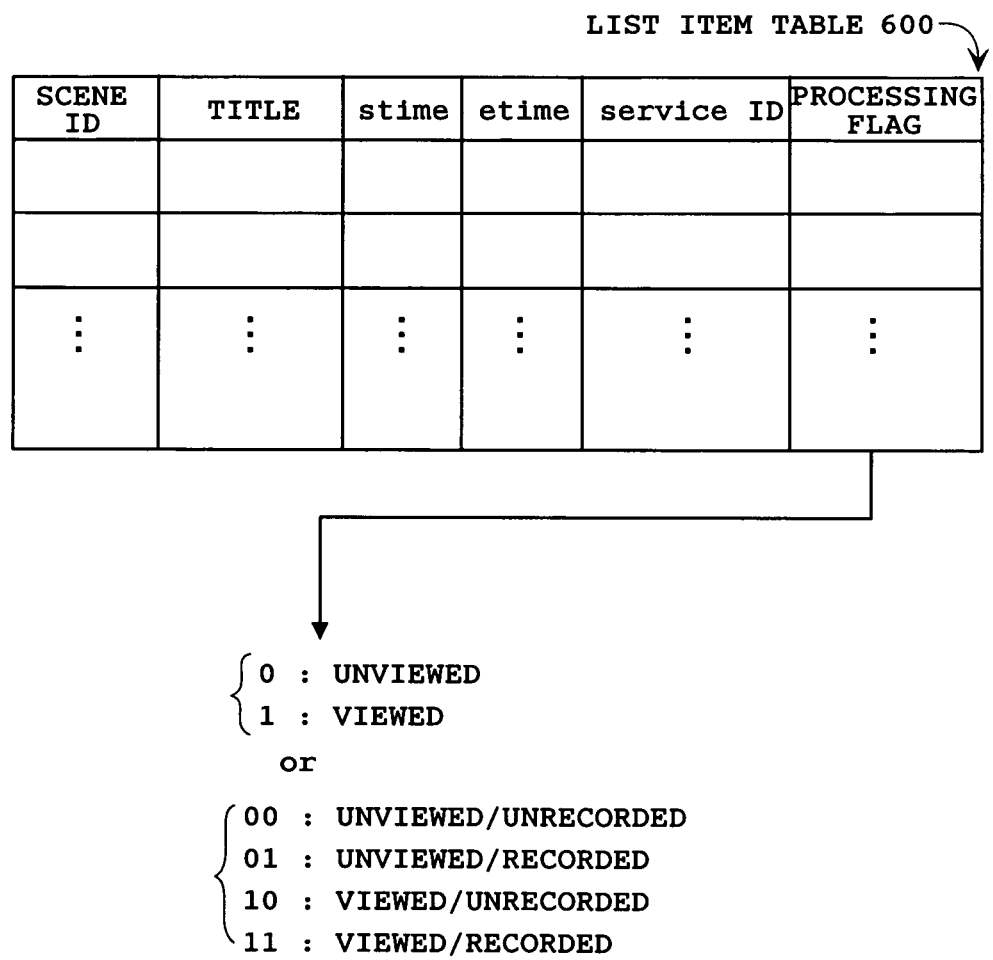
FIG. 17 is a diagram showing an example of a list item table, which manages the list items for listing the scene notification messages received by the mobile terminal, in the embodiment of the present invention.

FIG. 17 shows an example of a list item table 600 that manages the list items for listing the scene notification messages received by a mobile phone in this embodiment. Each list item has the item number, title (TITLE), start time (stime), end time (etime), broadcast identification information (serviceID), and processing flag. The broadcast identification information (serviceID) is an ID that uniquely identifies a service (arranged channel) transmitted by a broadcaster via the terrestrial digital broadcast. The 1-bit "processing flag" and the 2-bit "processing flag" are shown. The 1-bit processing flag and bit 1 (MSB) of the 2-bit processing flags are data indicating whether the user has viewed the scene where "0" indicates that the user has not yet viewed the scene and "1" indicates that the user has viewed the scene. The "2-bit" processing flag is used when the terminal has the timer recording function, and bit 0 (LSB) indicates whether or not the scene has been recorded. "0" indicates that the scene has not yet been recorded, and "1" indicates that the scene has been recorded.

Figure 18A:
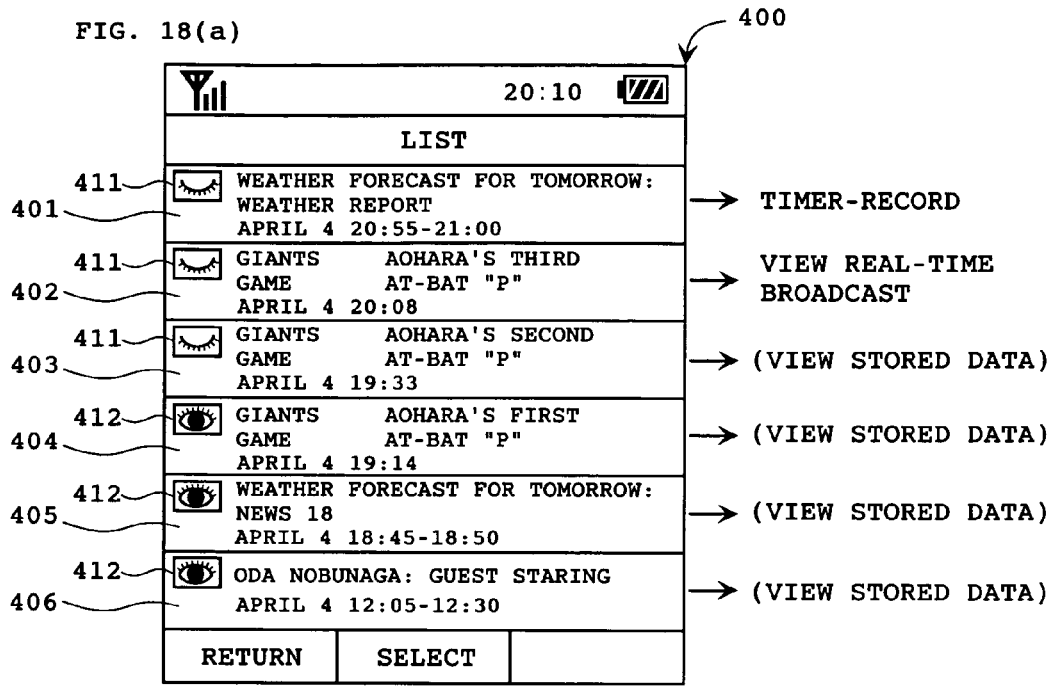
FIGS. 18(a) and (b) are diagrams showing examples of a list display screen in the embodiment of the present invention.
Figure 18B:
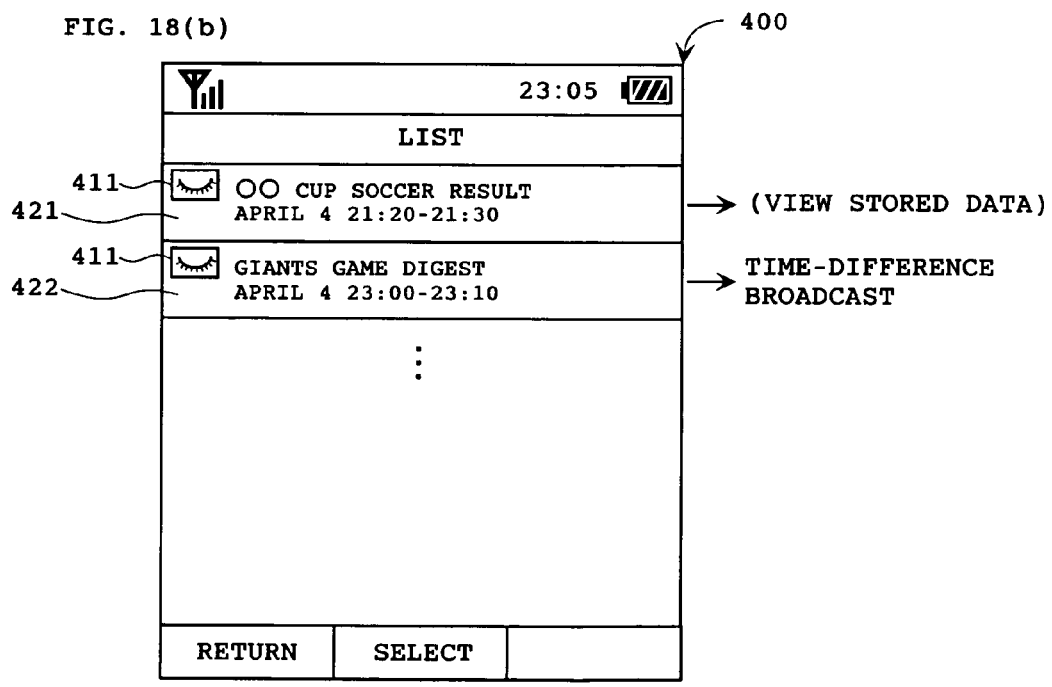

FIGS. 18(a) and (b) show two examples of a list display screen 400 that is displayed when the soft menu item 303 is selected which is displayed on the confirmation screens of the scene notification messages in FIGS. 15(a)-(d) and FIGS. 16(a)-(d) for displaying the "list". FIG. 18(a) includes list items 401-406 corresponding to the plurality of scene notification messages that have been received at 20:08 on April 4th. FIG. 18(b) shows the list screen corresponding to the scene notification messages that have been received at 23:05 on the same day. In the example shown, new list items 421 and 422 are added. In this embodiment, each list item includes the title and the start/end time (date and time) of the scene notification message and an unviewed icon 411 or a viewed icon 412 indicating whether the scene has been viewed or not. Although not shown, the icon type or the number of icons may be increased to reflect whether or not the scene has been recorded.

Figure 19A:
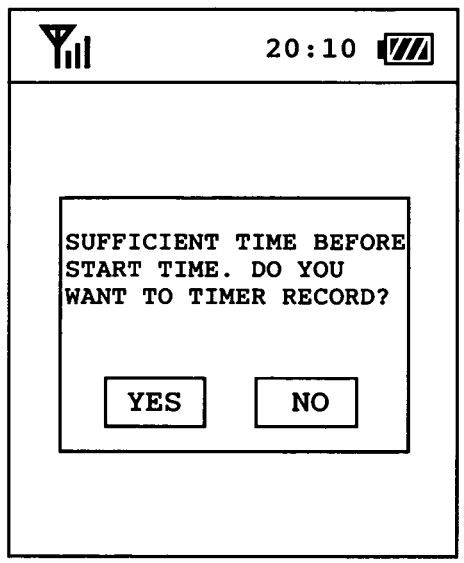
FIGS. 19(a)-(d) are diagrams showing examples of the screen on which the user is prompted to select processing corresponding to a list item selected on the list display screen in FIGS. 18(a) and (b)

The list item 401 corresponds to a scene notification message that is notified sufficiently earlier than the start time and the user has not yet viewed the scene. When the user selects the list item 401, the screen such as the one shown in FIG. 19(a) is presented to the user to prompt the user to timer-record the scene.

The list item 402 corresponds to a scene notification message that notifies the user about the predicted at-bat scene of a professional baseball player immediately before the player goes to the batter's box. When the user selects this item, the real-time broadcast viewing prompting message such as the one shown in FIG. 19(b) appears and, when the user responds to this message, the television function is started and the channel of the real-time broadcast of the scene is selected. Because this scene notification is a prediction-based notification, the mark "P" is added to the title. This mark tells the user that this scene is based on the prediction and that the scene will not be generated always exactly at the notified start time.

The list item 403 corresponds to a similar predicted scene notification but, at the confirmation time of this list item, the predicted end time (not shown in the list display) is already past and, so, the user cannot view the scene even if the user starts viewing the real-time broadcast. Therefore, as shown in FIG. 19(c), the screen is presented to the user to prompt the user to view the stored data.

All of the list items 404-406 are items indicating that the user has viewed the notified scene. Although it is possible that no action will be taken or an error message will be displayed when the user selects any of those already-viewed scenes, the user is prompted to view the stored data in the example in the figure considering that the user sometimes wants to view the scene again.

It is also possible to automatically erase a list item corresponding to a notified actual scene that has been viewed by the user. In this case, the list item may be erased either when the notification is received or when a predetermined time elapses after the user viewed the scene. This predetermined time may be fixed or specified by the user.

Figure 19C:
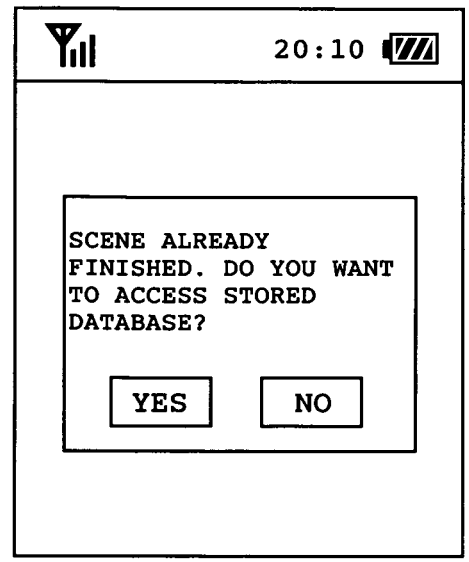
Figure 19B:
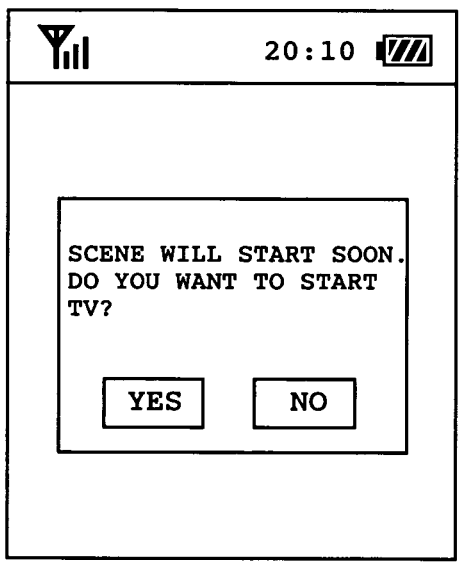
Figure 19D:
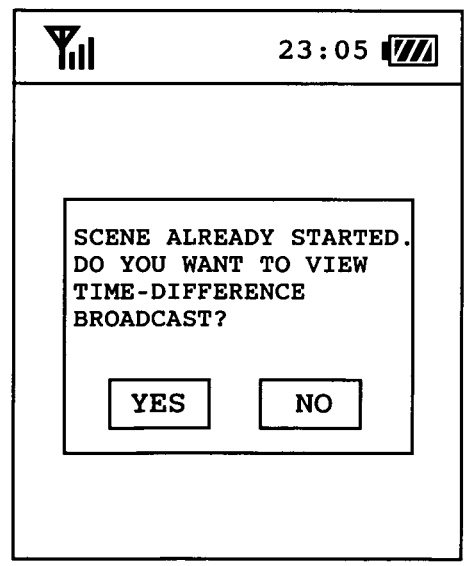

Because the end time of the scene of the list item 421 in FIG. 18(b) is past at this confirmation time (23:05), the user is prompted to view the stored data as shown in FIG. 19(c) when the user selects this list item. Because the start time (23:00) of the scene of the list item 422 is past but the end time (23:30) is not yet past and because the time elapsed from the start time to the confirmation time is within the time difference, the message presenting the time-difference broadcast to the user is shown in this example as shown in FIG. 19(d). At this time, the identification information on the time-difference broadcast and stime (and etime if possible) of the scene in the time-difference broadcast, which is calculated accurately from the actual broadcast, may also be notified.

FIGS. 20(a)-(f) collectively show the user-selectable processing switching modes in this embodiment that are determined by the relation among the start time (stime) and the end time (etime) notified and the message confirmation time. Note that this is exemplary only and the present invention is not limited to this example.

FIG. 20(a) shows the case in which the message is received and the user confirms the message at a time sufficiently earlier than the start time. In this case, the user is prompted to timer-record the scene and, when the user timer-records the scene in response to this prompt, the television is automatically started at the specified start time and the recording continues to the end time. In this case, the video and the audio need not be output during the recording.

FIG. 20(b) shows the case in which the message is received and user confirms the message immediately before the start time. In this case, when the user is prompted to view the scene and the user starts the television in response to this prompt, the corresponding channel of the television is selected from that moment and the video and the audio are output. The user can view the scene while recording it. Alternatively, the user can only record the scene without viewing it. When the user only records the scene, the output of the video and the audio can be stopped. The output (and the recording) of the video and the audio at the end time can be automatically stopped or manually stopped by the user.

FIG. 20(c) shows the case in which the message is received immediately before the start time, as in FIG. 20(b), but the user confirms the message at a time that is after the start time and is in the period during which the scene can be viewed by the time-difference broadcast. In this case, the user is prompted to view the time-difference broadcast and, when the user issues the instruction to view it, the time-difference broadcast is started from that moment to allow the user to view it. The user can record the scene, and stop viewing the scene, in the same way as in the case shown in FIG. 20(b).

FIG. 20(d) shows the case in which the message is received immediately before the start time, as in FIG. 20(b), but the user confirms the message after the end time. In this case, the user can access the stored data server via communication for viewing (and/or recording) the scene using the stored data.

FIG. 20(e) shows the case in which the message is received after the start time of the scene. This case corresponds to the case in which an unpredictable scene is generated and, after that, the scene notification message is generated and issued as described above. The scene start time in this case is the determined, exact start time. (The end time is also the determined, exact time when the scene was already ended when the notification message was created). At this time, if the user confirms the message in a period of time during which the user can view the scene by the time-difference broadcast, the user is prompted to view the scene by the time-difference broadcast. The scene notification message in this case notifies either the time, calculated by adding the time difference of the time-difference broadcast to the start (and end) time of the scene in the actual broadcast, or the start (and end) time and the time difference information. This notification, which identifies the start time of the scene in the time-difference broadcast, allows the user to start the television or timer-record the scene after waiting until the actual start time of the scene in the time difference broadcast reaches. It is also possible to allow the user to timer-start the television. Instead of viewing the time-difference broadcast, it is also possible to prompt the user to access the stored data (if possible). The rest of the processing is the same as that in FIG. 20(c).

FIG. 20(f) corresponds to the case in which the message is received after the start time of the scene and the user confirms the notification message at a period of time during which the user cannot confirm the scene by the time-difference broadcast. The content of the notification message is the same as the notification message in FIG. 20(e). In this case, the user is prompted to view the stored data in the same way as in FIG. 20(d).

Figure 21:
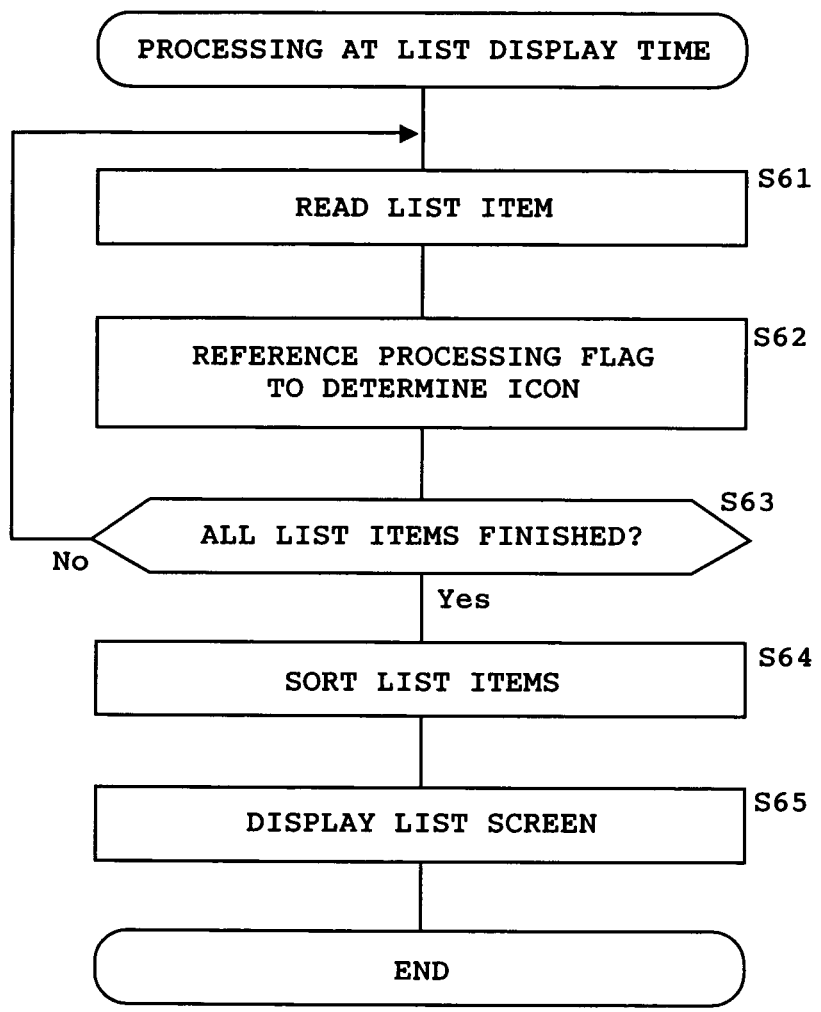
FIG. 21 is a flowchart showing an example of the list display processing for displaying the list display screen, such as the one shown in FIGS. 18(a) and (b), based on the content of the list item table 600, such as the one shown in FIG. 17, in the embodiment of the present invention.

FIG. 21 shows an example of processing at list display time in this embodiment for displaying the list display screen 400, such as the one shown in FIGS. 18(a) and (b), based on the content of the list item table 600 such as the one shown in FIG. 17. This processing is implemented by the program executed by the central control unit 201. The processing of other flowcharts that will be described is also implemented in the same way.

First, one list item is read from the list item table 600 (S61). Next, the processing flag of the item is referenced to determine the icon (S62). Steps S61 and S62 described above are repeated for all list items (S63). After that, the list items are sorted (rearranged) with an item, for example, the start time, as the key (S64), and the list screen such as the one shown in FIGS. 18(a) and (b) are displayed (S65).

Figure 22:
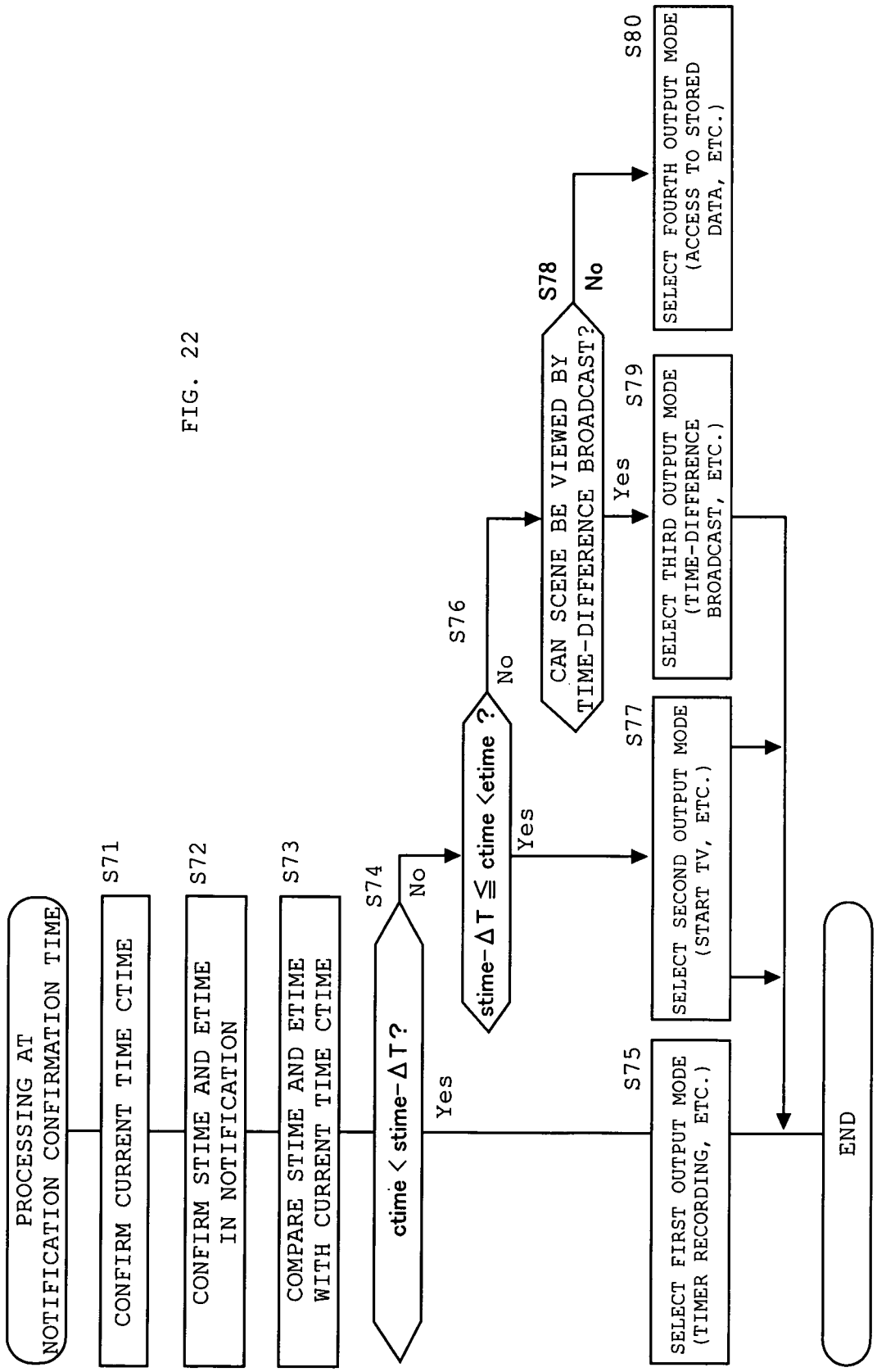
FIG. 22 is a flowchart showing an example of the notification confirmation time processing performed when the user confirms the scene notification message in the embodiment of the present invention.

Next, as shown in FIG. 22, the following shows an example of processing at notification confirmation time that is performed when the user confirms the scene notification message. The "confirmation" includes both confirmation that is made when a message is opened (displayed) (whether automatically or by user instruction) and confirmation that is made when an item is selected on the list screen (FIGS. 18(a) and (b)).

First, the current time ctime is confirmed by the clock unit 209 (FIG. 2) (S71). Next, the start time (stime) and the end time (etime) in the notification message are confirmed (S72). In addition, the start time and the end time are compared with the current time (S73).

If the current time is earlier than the time that is the predetermined time (T) earlier than the start time (S74, Yes), the first output mode (for example, timer recording, etc.) is selected (S75). If the current time is between the time that is predetermined time earlier than the start time and the start time (S76, Yes), the second output mode (for example, view the real-time broadcast by starting the television) is selected (S77). If the scene can be viewed by the time-difference broadcast (S78, Yes), the third output mode (for example, time-difference broadcast is selected) is determined (S79). If it is judged that the scene cannot be viewed by the time-difference broadcast, the fourth output mode (for example, access to the stored data server) is selected (S80).

Figure 23:
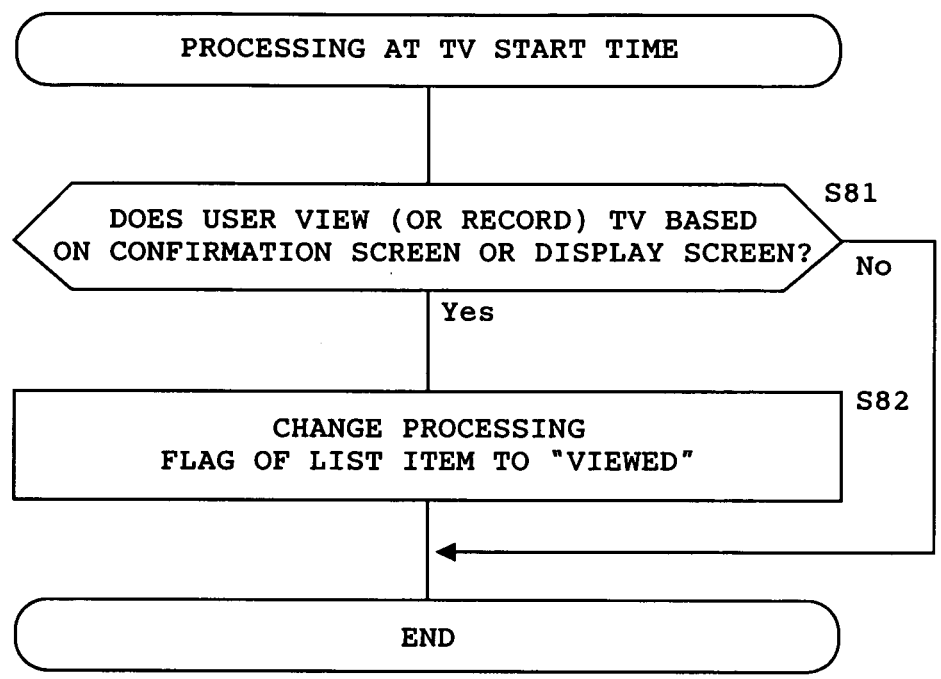
FIG. 23 is a flowchart showing an example of the television start time processing performed when the television function is started based on the scene notification message in the embodiment of the present invention.

FIG. 23 shows an example of processing at television start time that is executed when the television function is started based on the scene notification message. First, when an instruction is issued to view a television program based on the confirmation screen or the list display screen (S81, Yes), the processing flag of the list item in the list item table 600 is changed to "updated" (S82). When the processing flag reflecting whether or not the program has been recorded is used, the processing flag is also updated depending upon whether or not the program is recorded.

Figure 24A:
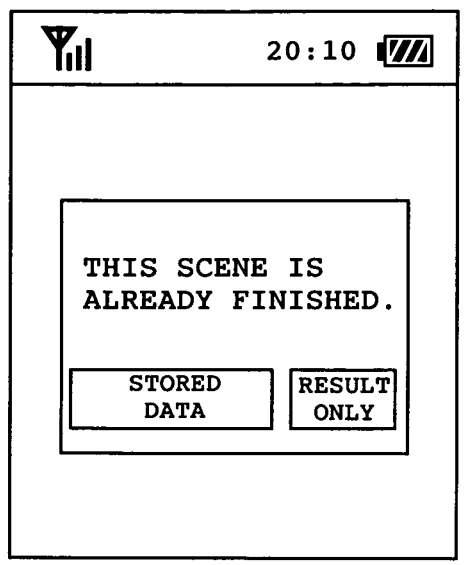
FIGS. 24(a) and (b) are diagrams showing an example of a modification of the embodiment of the present invention.
Figure 24B:
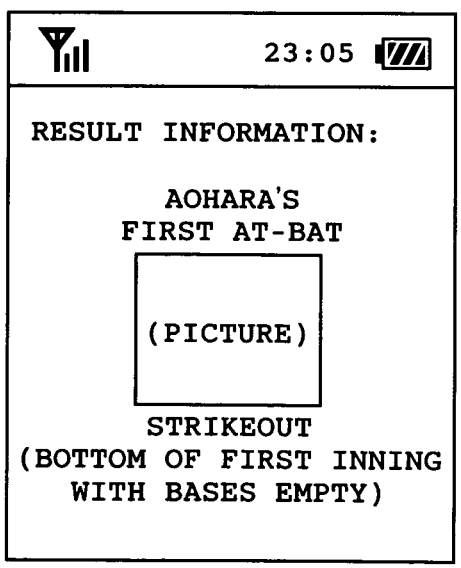

FIGS. 24(a) and (b) show examples of the screen for describing the modifications of this embodiment. FIG. 24(a) shows a modification of the screen that is presented when the user confirms the message notification after the broadcast of a scene is finished such as the one shown in FIG. 19(c). The screen shown in FIG. 19(c) simply prompts the user to access the stored data, whereas the screen shown in FIG. 24(a) allows the user to select either to access the stored data or to acquire information indicating the content of the scene as the result. This notification message includes the URL for acquiring the result data. When "RESULT ONLY" is selected on the screen in FIG. 24(a), the content of the URL is acquired via communication and the acquired content is displayed as shown in FIG. 24(b). The example shown here includes a picture (image data) and text data content assuming that the content is created in markup language. In addition, this screen may include an anchor point that creates audios when the user clicks on it. Although "STORED DATA" and "RESULT ONLY" are displayed for selection in the example of the screen of this modification, it is also possible to display the screen from which only "RESULT ONLY" is selected.

Next, the following describes a second embodiment of the present invention. The system configuration is similar to that in the first embodiment and, so, the duplicated description will not be repeated.

Figure 25:
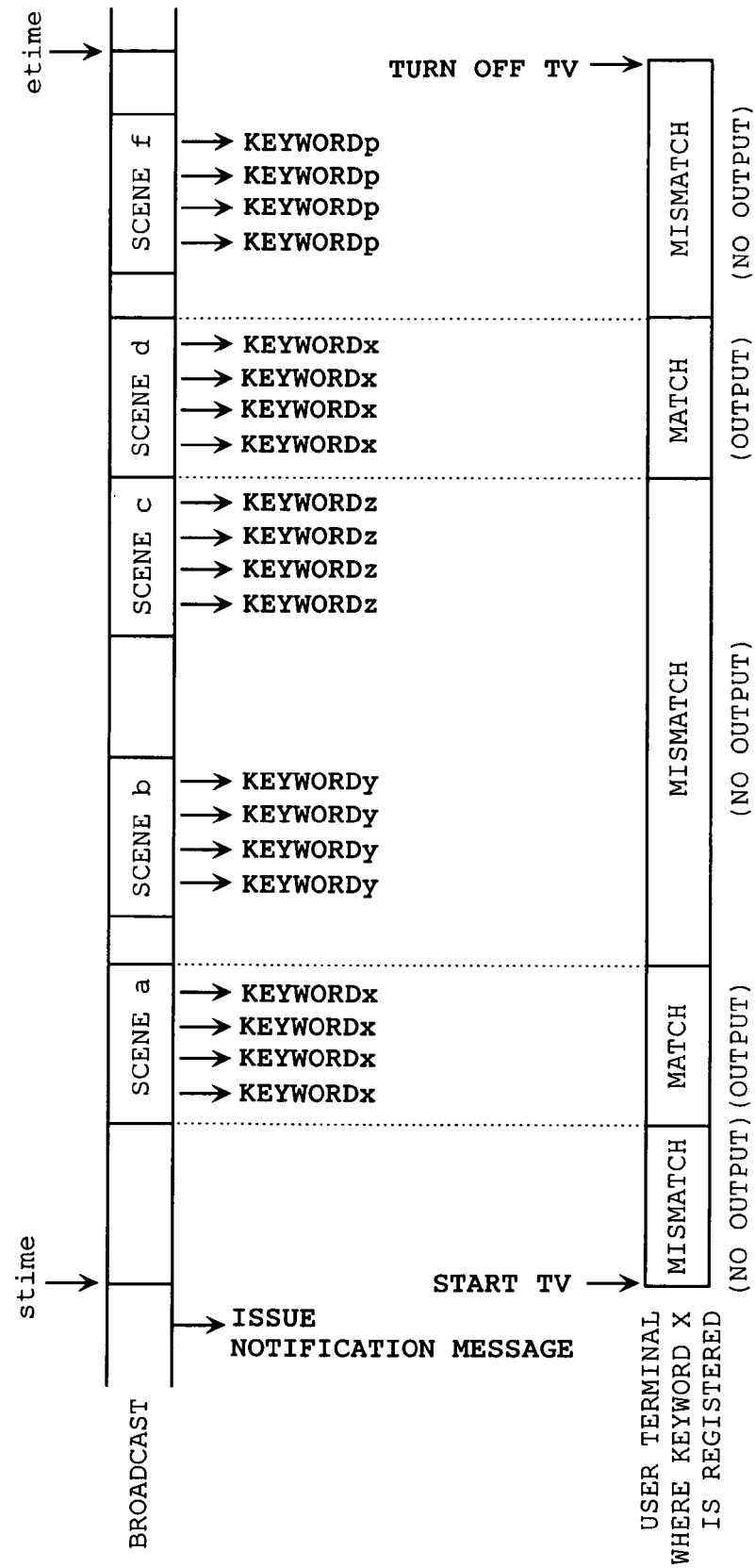
FIG. 25 is a diagram showing a second embodiment of the present invention.

In the embodiment described above, a scene notification message is created for each actual scene corresponding to a desired scene and the created scene notification message is issued to the user. On the other hand, a notification message is issued in this embodiment for each broadcast unit including a plurality of scenes which include the scenes desired by the user, as shown in FIG. 25. This broadcast unit is, for example, a program, and the service provider side sends a notification message to a user, who registers a scene in the program as a desired scene, with the start/end time of the program as "Start time(stime)" and "End time(etime)" and with the program title as "Title". Although a notification message in this embodiment corresponds to a program, the notification message is called a "scene notification message", as in the first embodiment, because the purpose of the notification message is to notify the user about a scene. In this embodiment, this scene notification message includes a keyword (called "desired scene information") that corresponds to a desired scene desired by the user and that corresponds to a scene appearing in the program. A keyword is included in this way to let the user terminal know a keyword corresponding to a user desired scene appearing in the program associated with this scene notification message.

If the keyword is stored in the user terminal at desired-scene registration time for later use, it is not always required that the keyword be included in the scene notification message.

After issuing a scene notification message, the service provider sends from the broadcast station 30 the keyword of each of actual scenes a-f, corresponding to the desired scene of any given user, periodically during the broadcast period of the scene. The keyword is sent "periodically", but not always at a regular interval. There is a keyword for each of scenes a-f as shown in the figure. The same keyword sometimes corresponds to different scenes (scene a and scene d in the figure). Although not shown, different keywords sometimes correspond to one scene. A keyword may be sent as data associated with the video and audio of the broadcast or may be sent by including the keyword in the BML document data of the digital broadcast. On the other hand, the registered user side starts the television on the terminal after confirming the scene notification message. That is, the user terminal starts receiving the broadcast at the start time in response to the notification message. Note that the television is started based on this notification message but without outputting (suppressing the output of) the video and audio (this is called background start). After the television is started in this way, the keyword received via the broadcast is compared serially with the keyword notified by the notification message and stored in the terminal (stored keyword). After that, the keyword received by the broadcast is compared with the keyword stored in the terminal, and the suppression of the video and audio output function is released during the keyword-matching period but the video and audio output function is suppressed again when the keyword-matching period is ended. When the time-difference broadcast is specified by the scene notification message, it is also possible to start in background the time-difference broadcast or to start in background the viewing of the scene by receiving the stored data behind the scenes. Because the keyword of the scene is added after the actual scene is determined in the case of the time-difference broadcast or the stored data, the keyword is reliably added to the scene period.

On the terminal with the recording function that records a broadcast, the recording is started, with the suppression of the video and audio output function released or with the output function suppressed, during the period in which the keyword received by the broadcast matches the keyword stored in the terminal. If the keyword-matching period is ended, the recording is stopped (The video and audio output function, if released, is suppressed again).

For example, in the example shown in the figure, the video and the audio are output on the user terminal, in which the keyword x is registered, during the broadcast period of scene a and scene d in which the same keyword x is sent, but the output is suppressed in the other periods.

This embodiment, in which the keyword is sent via the broadcast waves to all registered users as described above, eliminates the need to create a communication message for each registered user for each scene and to send it via communication.

Figure 26:
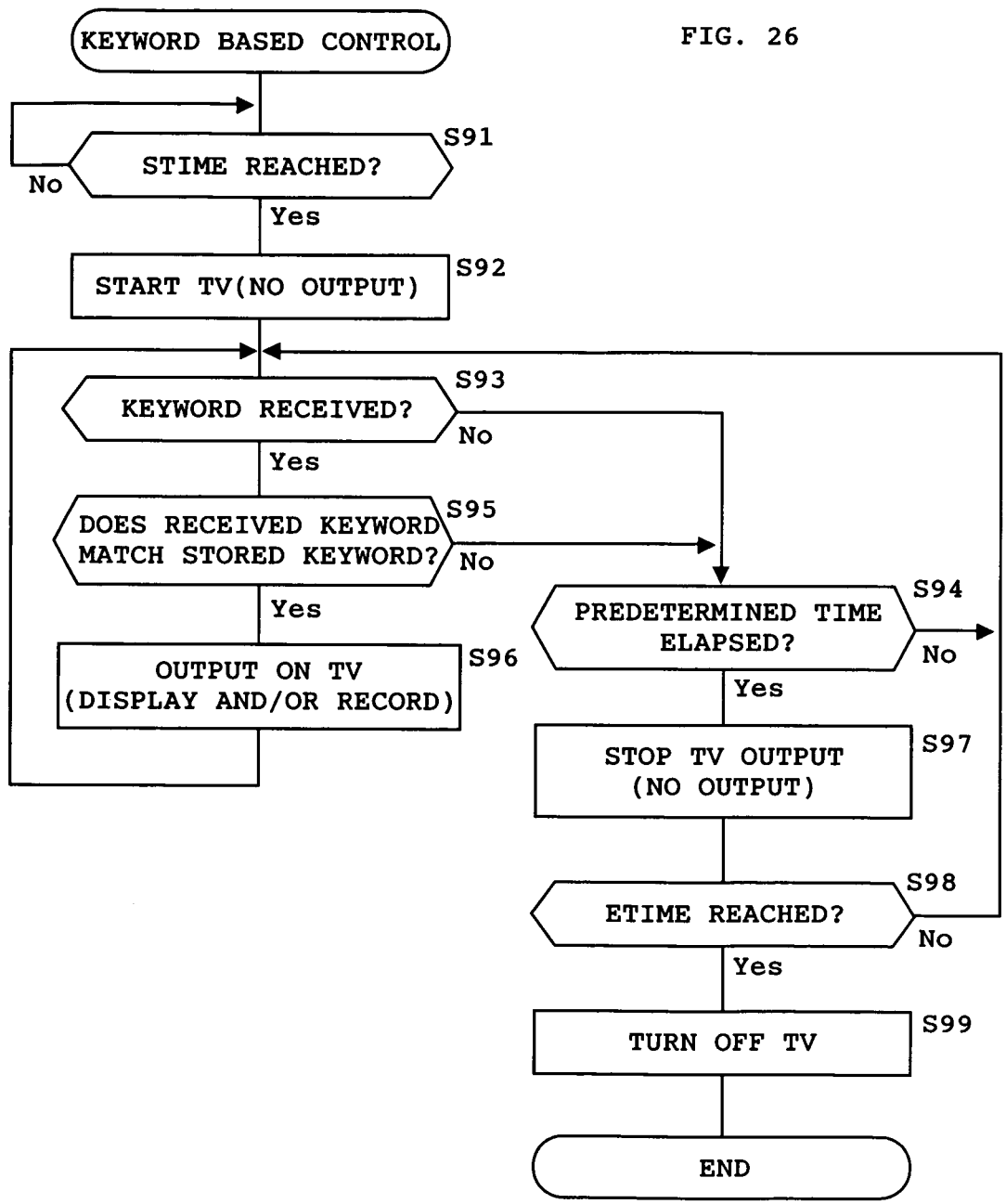
FIG. 26 is a flowchart showing the keyword based control in the second embodiment of the present invention.

FIG. 26 shows a flowchart showing the processing that is started after confirming a notification message in the second embodiment for performing the keyword based control processing.

When the start time (stime) of a notified broadcast unit such as a program reaches (S91, Yes), the television is started with the output of the video and audio suppressed (S92). After that, a keyword received by the broadcast is monitored (S93). If a keyword is received, the received keyword is compared with the stored keyword (S95). If both keywords match, the output of the television video and audio is started and/or the recording is started (S96). In addition, a popup notification (display), an audio notification (for example, sounds like "pip-pip"), or a vibration notification may be issued to the user. If no keyword is received for a predetermined time in step S93 (S94, Yes), it is determined that the scene is ended and the output of the television video and audio is stopped (suppressed again) (S97).

If the keywords do not match in step S95, control is passed to step S94 and, if a matching keyword is not received for a predetermined time, it is determined that the scene is ended and the output of the television video and audio is stopped (suppressed again) (S97). Until the end time (etime) is reached (S98), control is passed back to step S93 for monitoring a received keyword. When the end time of the broadcast unit such as a notified program reaches, the television power is turned off and the function, including the reception function, is stopped completely (S99).

Figure 27:
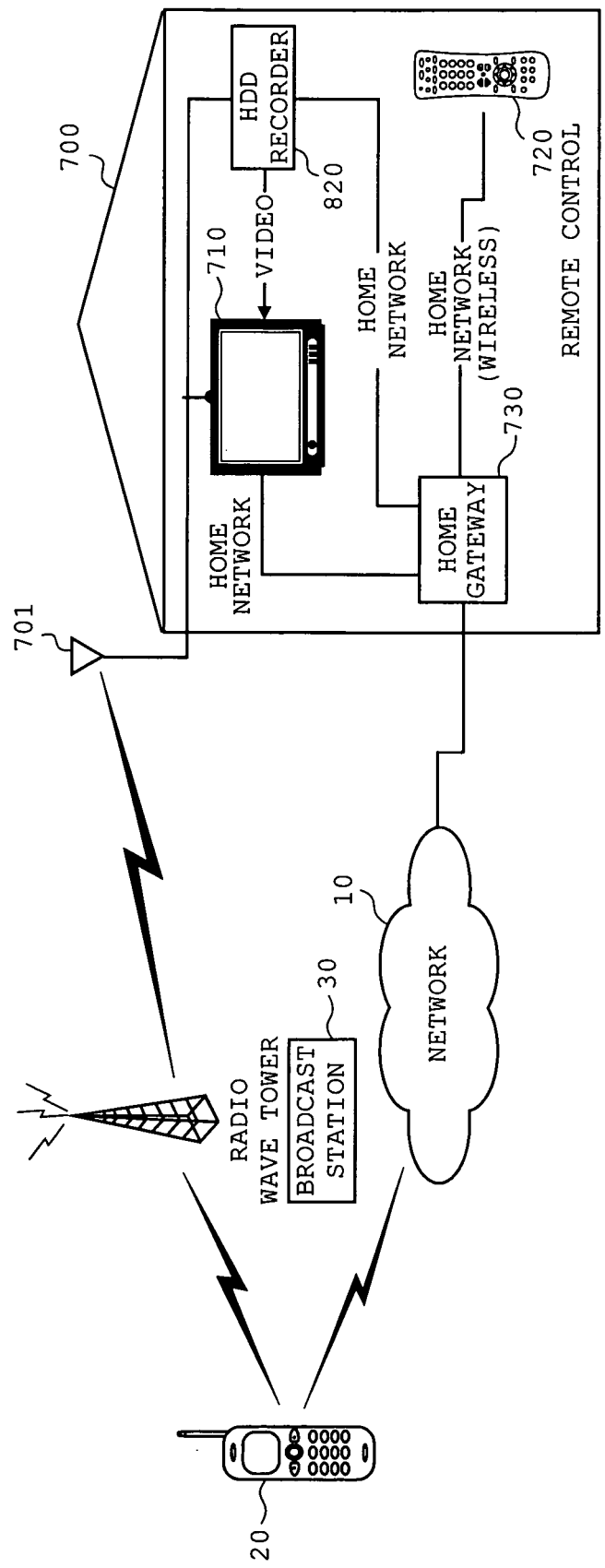
FIG. 27 is a diagram showing the system configuration of a modification of the embodiment of the present invention.

Next, the following describes a modification of this embodiment with reference to FIG. 27. In this modification, the function of various servers (registration server 40 and scene management server 42, message transmission server 46, stored data server 48) shown in FIG. 1 is provided in a device (a recording device such as an HDD recorder 800 in this example) in an individual home (HOME). The HDD recorder 800 has the home server function, and the user accesses the HDD recorder 800 from a mobile terminal 20 outside the home via a network 10 to receive a scene notification and view the scene based on the received scene notification. The scene that is viewed in this case is a scene broadcast by a broadcast station 30 or a scene stored in the HDD recorder 800.

In addition to the HDD recorder 800, a broadcast reception antenna 701, a television device (or monitor) 710, a remote control 720 used as a remote operation device, and a home gateway 730 are provided in a home 700. The HDD recorder 800, television device 710, and the remote control 720 are interconnected via the home gateway 730. The connection of those components configures a home network that employs an industry-standardized specification, such as a specification called DLNA (Digital Living Network Alliance), for interconnecting digital audio video apparatuses and a personal computer for using videos, music, and still images among themselves. The television device 710 can play back and display the video signals acquired from the HDD recorder 800, the video signals acquired from the home network, and the video signals acquired from the antenna 701. The home gateway 730 is responsible for communication among the components, for communication to and from the network 10, and for protocol conversion.

Figure 28:
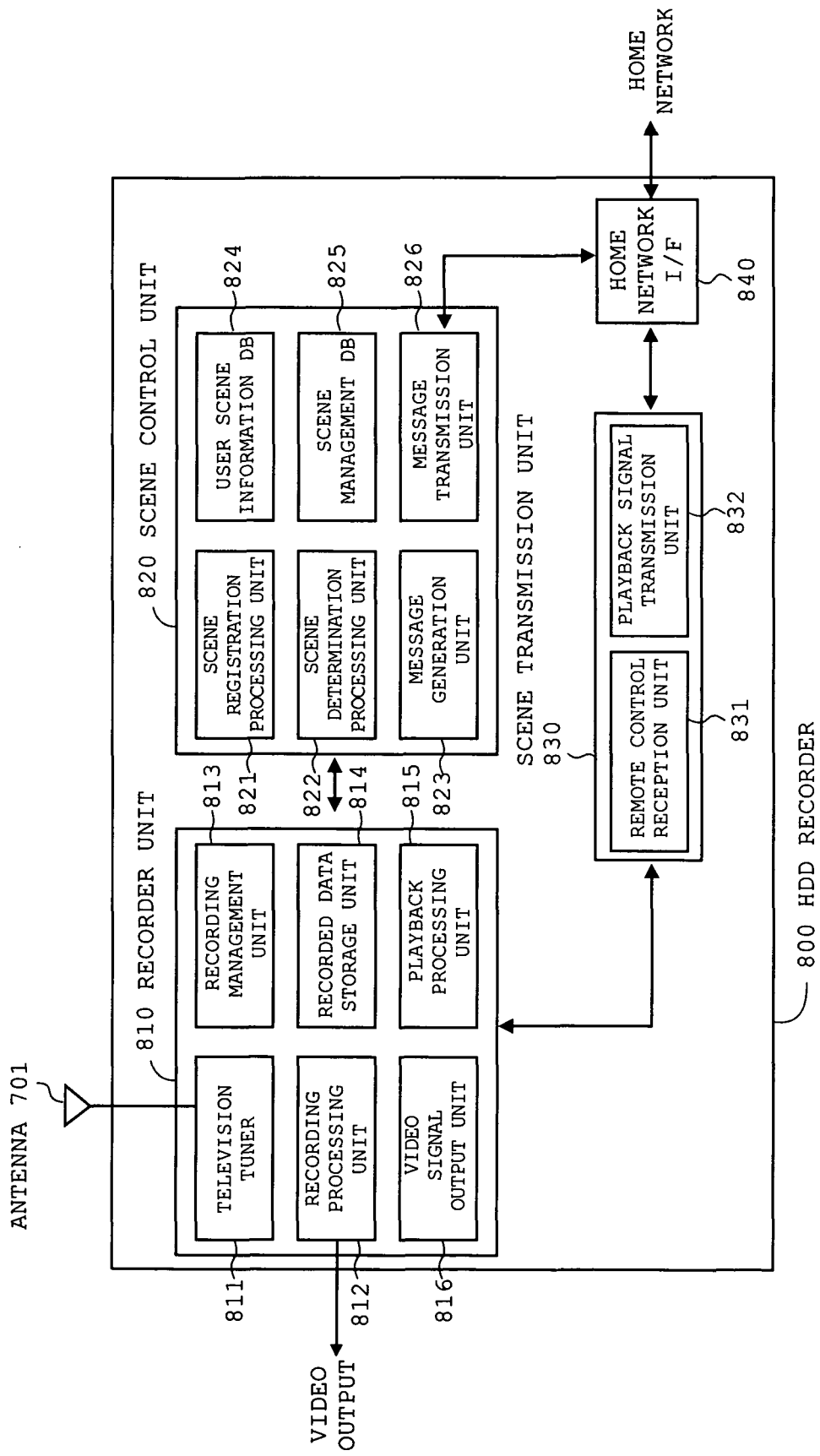
FIG. 28 is a diagram showing an example of the internal configuration of an HDD recorder shown in FIG. 27.

FIG. 28 shows an example of the internal configuration of the HDD recorder 800 shown in FIG. 27. The HDD recorder 800 basically comprises a recorder unit 810 that is related to broadcast reception and recording/creation processing, a scene control unit 820 that performs various scene-related processing of the present invention, a scene transmission unit 830 that transmits a scene to a mobile terminal 20, and a home network interface (I/F) 840 connected to the home gateway 730 for communication among the scene control unit 820, scene transmission unit 830, and the home network.

The recorder unit 810, connected to the scene control unit 820 and the scene transmission unit 830, has the same function as that of the existing HDD recorder 800. More specifically, the recorder unit 810 comprises a television tuner 811 that receives a television broadcast via the broadcast reception antenna 701 and tunes in on a station, a recording processing unit 812 that records a broadcast program, a recording management unit 813 that timer-records a program or manages the recorded programs, a recorded data storage unit 814 in which recorded data is stored, a playback processing unit 815 that plays back a recorded program, and a video signal output unit 816 that outputs video signals received from the television tuner 811 or the playback processing unit 815.

The scene control unit 820, connected to the recorder unit 810 and the home network I/F 840, performs scene-related control in this embodiment. More specifically, the scene control unit 820 comprises a scene registration processing unit 821 that registers a user desired scene, a scene determination processing unit 822 that determines if each scene in a broadcast program corresponds to a desired scene, a message generation unit 823 that generates a scene notification message, a user scene information DB 824 in which scene information on user desired scenes is stored, a scene management DB 825 in which various types of attribute information on actual scenes in a received broadcast program are stored and managed for managing the scenes, and a message transmission unit 826 that transmits a scene notification message to the mobile terminal 20 of the user. The actual content of an actual scene managed in the scene management DB 825 is stored in the recorded data storage unit 814. The scene determination processing unit 822 makes a determination based on data included in the broadcast signal/data. The scene transmission unit 830, connected to the recorder unit 810 and the home network I/F 840, comprises a remote control reception unit 831 that accepts a remote control instruction from the remote control 720 and a playback signal transmission unit 832 that transmits the played-back signal of the video to the mobile terminal 20 via the home network I/F 840.

Figure 29:
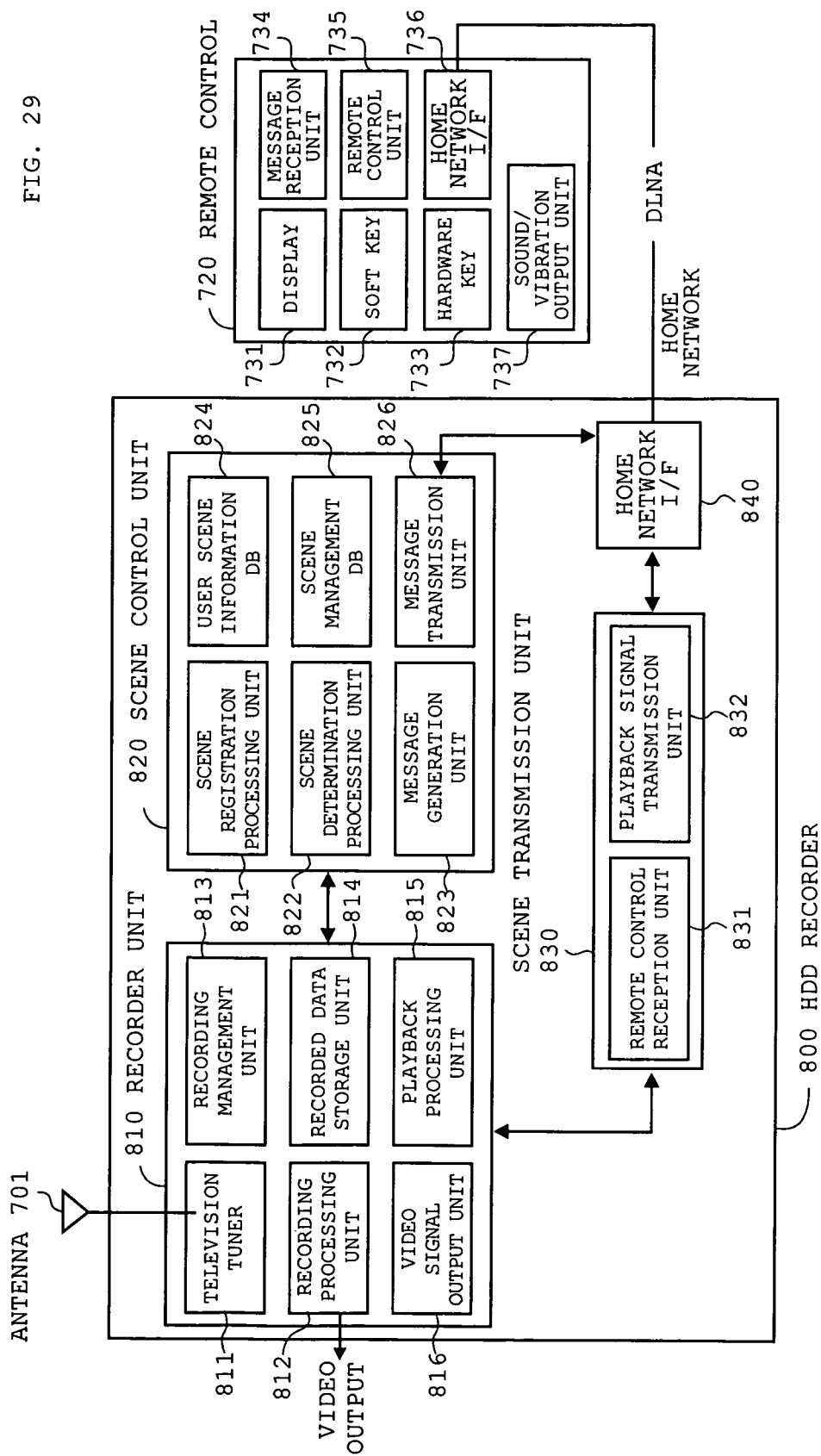
FIG. 29 is a diagram showing an example of a modification of the remote control shown in FIG. 27.

FIG. 29 shows a modification of the remote control 720. The same reference numerals are used to denote the same elements shown in other figures, and further description of that element will be omitted. The remote control 720 shown in FIG. 29 comprises a display 731 that has a display screen on which a scene can be browsed, a soft key 732 displayed on the display screen, a hardware key 733 provided on the remote control casing, a message reception unit 734 that receives a scene notification message, a remote control unit 735 that remotely controls the HDD recorder 800 and the television device 710, a home network I/F 736 that connects the remote control to a home network, and a sound/vibration output unit 737 that outputs sounds and/or vibrations for notifying that a message is received. The configuration of the remote control 720, which has the function described above, allows the user to receive a desired-scene notification and view the scene by the remote control.

The remote control 720 may have the same function as that of the mobile terminal 20 though not shown in the figure. This is considered that the remote control function is added to the mobile terminal 20.

FIG. 30 shows the system configuration for explaining an application of the system in FIG. 27. In this example, the user views scenes primarily based on the stored data. In the system in FIG. 27, a scene creator 750 publicizes the information, which is stored in the scene management DB 825 as the information on user-registered desired scenes, on the network 10 as a scene list. The scene creator 750 may include the HDD recorder 800 in the home 700 in FIG. 30. Alternatively, the information equivalent to a scene notification message sent to each user is notified to a specific service company that creates a scene list based on the message. The scene list created by the service company can be accessed via the URL of the site of the service company. For a scene list created by other users, necessary information can be acquired via a file exchange software program through the peer-to-peer operation.

A scene list is, for example, a collection of scene notification messages such as the one shown in FIG. 13(*b*). This scene list contains information on actual scenes which are included in desired scenes registered by other users and to which a scene notification is actually received. Therefore, even if a user does not register a desired scene himself or herself, the user can register a scene list filtering keyword in the HDD recorder 800 to extract the content of a scene notification message, corresponding to the keyword, from other user's scene list. The "keyword" in this case is included in the concept of a "desired scene" in the present invention. The user can receive a new scene notification based on the extracted information and view the actual scene.

The following describes the general operation of this application with reference to FIG. 30. It is assumed that a scene list is already created.

(1) First, the user of the mobile terminal 20 determines a program, which the user wants to view, from the EPG, an advertisement, or an existing service. More specifically, the user selects the program on the mobile terminal 20.

(2) The mobile terminal 20 instructs the HDD recorder 800 to record the program according to the user operation.

(3) The HDD recorder 800 records the specified program.

(4) After that, the HDD recorder 800 searches/acquires the scene list of the recorded programs via the network.

(5) The HDD recorder 800 filters the acquired scene list with the registered keyword to extract the corresponding scene information.

(6) The HDD recorder 800 notifies the extracted one or more pieces of scene information to the user as the scene notification message. Note that this notification message format need not be the same as the scene notification message format described above.

(7) In response to an instruction from the user, the mobile terminal 20 requests the HDD recorder 800 to extract one or more scenes for viewing based on the received notification.

Because it is supposed in this example that the actual scenes are stored in the HDD recorder 800 in the home, the scene list search/acquisition related to a recorded program is started when the program is recorded. Instead, if the public stored data server 48 such as the one shown in FIG. 1 is available for use, it is possible to immediately search the scene list using the registered keyword without recording a program in the HDD recorder 800 in the home.

It is also possible to automatically determine a recorded program from the EPG based on a keyword and to notify the scene of the keyword.

In addition, it is possible that the user receives a scene notification and, after viewing the user, the user views the stored program. This means that the user can determine whether to browse the program based on the scene and, so, this capability is useful for stored-type viewing.

The scene determination processing unit 822 of the HDD recorder 800 may determine a scene based not only on an external scene list but also on a keyword included in broadcast data (higher-concept data including data received via datacasting).

While preferred embodiments of the present invention have been described, it will be understood that the present invention is not limited to those embodiments but that various modifications and changes can be made.

For example, the time-difference broadcast is not necessarily a required element, but an embodiment is possible in which, unlike this embodiment described above in which both the time-difference broadcast and the stored data access are provided, the time-difference broadcast is not provided. Although the prompt for viewing the time-difference broadcast and the prompt for accessing the stored data are separately described, they can be used alternatively if only one of them is used. For example, the prompt for viewing the time-difference broadcast may be replaced by the prompt for accessing the stored data, and vice versa. Before displaying the prompt for viewing the time-difference broadcast, it is possible to check if the user can now view the scene by the time-difference broadcast and display the prompt only when the user can view the scene.

As described above, the broadcast reception/playback capability includes the function to receive and play back the broadcast data not transmitted by broadcast waves but generated by the IP technology, that is, the broadcast data not transmitted by the radio wave broadcast but generated by the communication infrastructure of a mobile terminal device. Although the television broadcast is assumed, the present invention is applicable to the radio broadcast and a scene notification message about an audio scene may also be issued.

It is possible to request the user to pay for the scene notification service. The payment is made on a scene basis, on a scene genre basis, or on a period (for example, monthly) basis with no limitation on the number of scenes, or is made by combining them. Another method is also possible in which the sponsor of an advertisement attached to a scene pays the fee and the users do not pay for the service.

A special reception box may be provided in the message box 47 to automatically store a scene notification message when it is received via a short message or by electronic mail. This box prevents scene notification messages from being mixed with other messages, allowing the user to easily recognize and manage scene notification messages.

INDUSTRIAL APPLICABILITY

The present invention can be widely used for the development and manufacturing of a broadcast and communication system and the components of this system.

The invention claimed is:

1. A mobile terminal device, comprising:
   a broadcast reception unit configured to receive a broadcast;
   a viewing unit used to view the received broadcast;
   a communication unit connected to a communication network, the communication unit configured to receive a notification message that includes broadcast unit identification information, which identifies a broadcast unit that includes a scene corresponding at least to a part of a broadcast program, and a start time and an end time of the broadcast unit; and
   a control unit configured to start, in response to the notification message, receiving a broadcast by said broadcast reception unit at the start time of the broadcast unit with a video and audio output function of said viewing unit suppressed and, after that, compares scene information received by the broadcast with desired scene information stored in the terminal, releases the suppression of the video and audio output function of said viewing unit while a match between both information is confirmed, and suppresses the video and audio output function of said viewing unit again if the match is not confirmed.

2. A mobile terminal device, comprising:
   a broadcast reception unit configured to receive a broadcast;
   a viewing unit used to view the received broadcast;
   a communication unit configured to receive a notification message that includes scene identification information, which identifies a scene corresponding at least to a part of a broadcast program, and start/end time information thereof; and
   a control unit configured to compare a current time with the start/end time of the scene when a user confirms the notification message and switches user-selectable processing based on a relation between the current time and the start/end time.

3. The mobile terminal device according to claim 2, wherein:
   a predetermined time is earlier than the start time, and
   when the current time is between the predetermined time and the start time, said control unit is configured to prompt the user to immediately view the program.

4. The mobile terminal device according to claim 2, wherein:
   a predetermined time is earlier than the start time, and
   when the current time is earlier than the predetermined time, said control unit is configured to prompt the user to timer-record the scene.

5. The mobile terminal device according to claim 2, wherein when the current time is between the start time and the end time of the scene, said control unit is configured to prompt the user to select at least one of immediately viewing the program, viewing a time-difference broadcast of the scene, and accessing a server in which data of the scene is stored.

6. The mobile terminal device according to claim 5, wherein the notification message includes at least one of identification information on the time-difference broadcast and information on access to said server.

7. The mobile terminal device according to claim 6, wherein
   the broadcast of the program is a digital broadcast; and
   the time-difference broadcast is lower than a corresponding real-time broadcast in an information amount per unit time.

8. The mobile terminal device according to claim 2, wherein when the current time is later than the end time of the scene, said control unit is configured to prompt the user to select at least one of accessing a server, in which data of the scene is stored, by said communication unit and viewing a time-difference broadcast of the scene.

9. The mobile terminal device according to claim 8, wherein the notification message includes at least one of access information for accessing said server and identification information on the time-difference broadcast.

10. The mobile terminal device according to claim 2, wherein when the current time is later than the end time of the scene, said control unit is configured to prompt the user to access a server, in which result information related to the scene is stored, by said communication unit.

11. The mobile terminal device according to claim 2, further comprising a display unit as a part of said viewing unit for listing contents of a plurality of received notification messages on a display screen, wherein when the user selects a display item of one of notification messages from the list, said control unit is configured to switch user-selectable processing depending upon a relation between the start/end time of the scene specified by the notification message and the current time.

12. The mobile terminal device according to claim 11, wherein said display unit is configured to display information, which indicates whether or not the user has viewed the scene, for each notification message on the display screen of the list.

13. A non-transitory computer-readable medium storing a computer program executable on a mobile terminal device comprising a broadcast reception capability that receives a broadcast; a viewing capability used to view the received broadcast; and a communication function that receives a notification message that includes scene identification information, which identifies a scene corresponding at least to a part of a broadcast program, and start/end time information thereof, said computer program comprising the steps of:
  comparing a current time with the start/end time of the scene when a user confirms the notification message; and
  switching user-selectable processing based on a relation between the current time and the start/end time.

14. The mobile terminal device according to claim 8, wherein when the current time is later than the end time of the scene, said control unit is configured to prompt the user to access a server, in which result information related to the scene is stored, by said communication unit.

15. A mobile terminal device, comprising:
  a broadcast reception unit configured to receive a broadcast;
  a viewing unit configured to display the received broadcast;
  a communication unit connected to a communication network, the communication unit configured to receive a notification message that includes broadcast unit identification information, which identifies a broadcast unit that includes a scene corresponding at least to a part of a broadcast program, and a start time and an end time of the broadcast unit; and
  a control unit configured to start, in response to the notification message, receiving a broadcast by said broadcast reception unit at the start time of the broadcast unit with a video and audio output function of said viewing unit suppressed and, after that, compares scene information received by the broadcast with desired scene information stored in the terminal, releases the suppression of the video and audio output function of said viewing unit while a match between both information is confirmed, and suppresses the video and audio output function of said viewing unit again if the match is not confirmed, the desired scene information stored in the terminal prior to receiving the notification message.

* * * * *